(12) United States Patent
Goden

(10) Patent No.: US 12,140,727 B2
(45) Date of Patent: Nov. 12, 2024

(54) DETECTION SYSTEM AND IMAGE FORMING APPARATUS

(71) Applicant: CANON KABUSHIKI KAISHA, Tokyo (JP)

(72) Inventor: Tatsuhito Goden, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 17/708,858

(22) Filed: Mar. 30, 2022

(65) Prior Publication Data

US 2022/0317331 A1    Oct. 6, 2022

(30) Foreign Application Priority Data

Apr. 6, 2021    (JP) ................... 2021-064818

(51) Int. Cl.
*G01V 8/20*    (2006.01)
(52) U.S. Cl.
CPC .................... *G01V 8/20* (2013.01)
(58) Field of Classification Search
None
See application file for complete search history.

(56) References Cited

U.S. PATENT DOCUMENTS

| | | | |
|---|---|---|---|
| 2007/0200566 A1* | 8/2007 | Clark | G01V 5/0008 324/318 |
| 2008/0025464 A1* | 1/2008 | Foland | G01N 23/04 378/57 |
| 2008/0043917 A1* | 2/2008 | Oreper | G01V 5/0025 378/114 |
| 2008/0179526 A1 | 7/2008 | Xu et al. | |
| 2008/0205583 A1* | 8/2008 | Seppi | G01T 1/2985 378/57 |
| 2008/0296501 A1* | 12/2008 | Breit | G01J 3/42 250/336.1 |
| 2009/0056455 A1 | 3/2009 | Ouchi | |
| 2020/0296266 A1 | 9/2020 | Koyama et al. | |
| 2021/0041289 A1 | 2/2021 | Iimori et al. | |
| 2021/0385424 A1* | 12/2021 | Assmann | H04N 13/239 |
| 2023/0110775 A1* | 4/2023 | Numata | G06V 10/141 250/350 |
| 2023/0112817 A1* | 4/2023 | Yamaguchi | G01S 13/89 342/22 |

FOREIGN PATENT DOCUMENTS

| | | |
|---|---|---|
| JP | 2016-11895 A | 1/2016 |
| JP | 2020-115107 A | 7/2020 |
| JP | 2020-153973 A | 9/2020 |
| JP | 2021-25940 A | 2/2021 |

OTHER PUBLICATIONS

European Search Report issued Sep. 12, 2022 in corresponding EP Application No. 22166451.9.

* cited by examiner

Primary Examiner — Marcus H Taningco
(74) Attorney, Agent, or Firm — VENABLE LLP

(57) ABSTRACT

A detection system including a plurality of terahertz light sources; and a plurality of terahertz-wave detecting devices which detect terahertz waves, wherein the plurality of terahertz light source includes a first terahertz light source which outputs the terahertz waves in a first on/off pattern with a first cycle, and a second terahertz light source which outputs the terahertz waves in a second on/off pattern with a second cycle which is different from the first cycle.

18 Claims, 13 Drawing Sheets

DETECTION SYSTEM AND IMAGE FORMING APPARATUS

BACKGROUND OF THE INVENTION

Field of the Invention

The present invention relates to a detection system which acquires information by irradiating an object with terahertz waves.

Description of the Related Art

An inspection technology using terahertz waves is known. The terahertz waves can be defined as electromagnetic waves having a frequency of at least 30 GHz and not more than 30 THz. Japanese Patent Application Publication No. 2020-153973 discloses a detection system which detects a dangerous item such as a gun, a knife, an explosive or the like, for example, by irradiating an inspection target such as a human or an animal with the terahertz waves and acquiring an image by receiving the terahertz waves transmitted through cloth, skin or the like and reflected.

According to Japanese Patent Application Publication No. 2020-153973, with the inspection target being inspected from a plurality of directions, the detection system is constituted by a plurality of sets in which a detecting device which detects the terahertz waves (hereinafter, a terahertz-wave detecting device) and a light source which emits the terahertz waves (terahertz light source) are disposed. In the plurality of sets, a first set is constituted by a first terahertz light source and a first terahertz-wave detecting device, and a second set is constituted by a second terahertz light source and a second terahertz-wave detecting device. In the constitution as above, when only the terahertz waves emitted from the second terahertz light source are to be detected by the second terahertz-wave detecting device, unnecessary terahertz waves emitted from the first terahertz light source are also detected, and detection by the second terahertz-wave detecting device might be inhibited.

SUMMARY OF THE INVENTION

The object of the disclosure is to provide a terahertz-wave detection system having a plurality sets of terahertz-wave detection apparatuses and terahertz light-source that can cancel unnecessary terahertz waves so as to precisely detect terahertz waves from a desired light source.

The first aspect of the disclosure is a detection system comprising: a plurality of terahertz light sources; and a plurality of terahertz-wave detecting devices which detect terahertz waves, wherein the plurality of terahertz light source comprises a first terahertz light source which outputs the terahertz waves in a first on/off pattern with a first cycle, and a second terahertz light source which outputs the terahertz waves in a second on/off pattern with a second cycle which is different from the first cycle.

The second aspect of the disclosure is an image forming apparatus comprising: a plurality of terahertz light sources; and a plurality of terahertz-wave detecting devices which detect terahertz waves, wherein the plurality of terahertz light sources includes a first terahertz light source which outputs the terahertz waves in a first on/off pattern with a first cycle, and a second terahertz light source which outputs the terahertz waves in a second on/off pattern with a second cycle which is different from the first cycle, each of the plurality of terahertz-wave detecting devices has pixels having at least a terahertz-wave detection portion, a signal amplification portion, and a signal accumulation portion and disposed in plural in a matrix state, the plurality of terahertz detecting devices includes a first terahertz-wave detecting device which detects terahertz waves in synchronization with the first on/off pattern, and a second terahertz-wave detecting device which detects terahertz waves in synchronization with the second on/off pattern.

According to the disclosure, provided is a terahertz-wave detection system having a plurality sets of terahertz-wave detection apparatuses and terahertz light-source that can cancel unnecessary terahertz waves so as to precisely detect terahertz waves from a desired light source.

Further features of the present invention will become apparent from the following description of exemplary embodiments with reference to the attached drawings.

DESCRIPTION OF THE EMBODIMENTS

Hereinafter, an example of a specific embodiment of a terahertz-wave detection system according to the present invention will be described by referring to figures. Here, the terahertz waves can be defined as electromagnetic waves having a frequency of at least 30 GHz and not more than 30 THz.

The terahertz-wave detection system includes a plurality of terahertz light sources and a plurality of terahertz-wave detecting devices. The terahertz-wave detecting device is constituted by including at least a terahertz-wave detection sensor, a lens, and a housing. The terahertz-wave detection sensor is a semiconductor device having a plurality of pixels which convert the terahertz waves to electric signals. The terahertz light source includes a device which emits the terahertz waves. The terahertz light source includes an antenna constituted by a differential negative resistance element and a resonance circuit, for example. As the differential negative resistance element, a resonant tunnel diode, an Esaki diode, a Gunn diode or the like is used.

The terahertz-wave detection system according to this embodiment can form an image by two-dimensionally disposing detection data acquired from the terahertz-wave detecting device and thus, it can be also used for an image forming apparatus. The detection sensor used for the image forming apparatus may have a configuration in which the pixels are aligned in a matrix state (two-dimensional state) or may be configured to acquire two-dimensional data by disposing the pixels in a line state (one-dimensional state) and scanning them. Other than the above, the terahertz-wave detection system according to this embodiment can be also used for a communication system having the terahertz light source as a transmission portion and the terahertz-wave detecting device as a reception portion.

Figure 1:
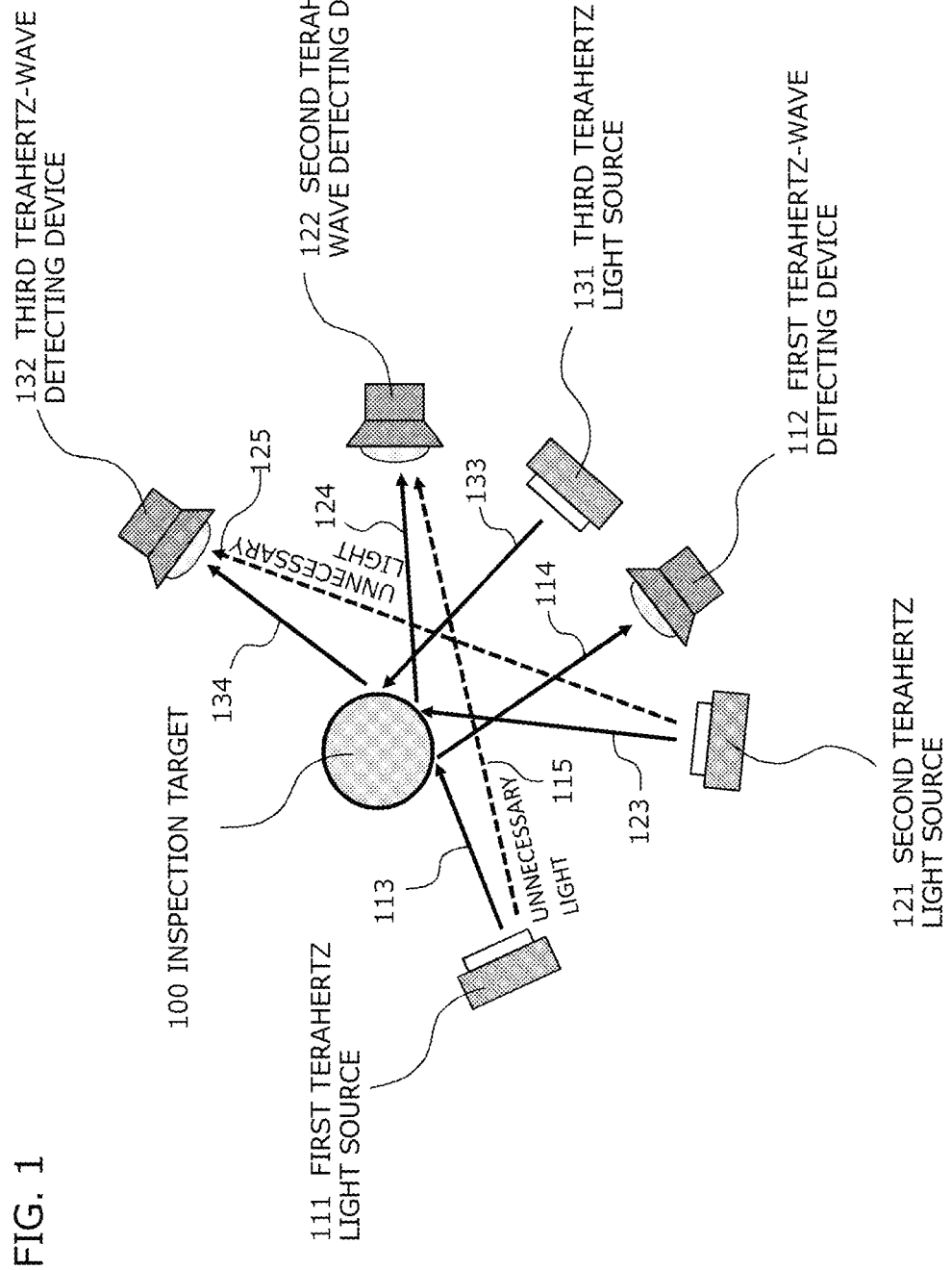
FIG. 1 is a diagram for explaining an example of a terahertz-wave detection system according to an embodiment.

Note that known or publicly known arts in the technical field can be applied to portions not particularly illustrated or described in this embodiment. Note that the present invention is not limited to the embodiment below but can be changed as appropriate within a range not departing from a gist thereof Terahertz-Wave Detection System FIG. 1 is a diagram for explaining an example of a terahertz-wave detection system according to this embodiment (hereinafter, also referred to as a detection system). In order to inspect an inspection target 100 from a plurality of directions, a plurality of sets of a terahertz-wave detecting device and a terahertz light source are disposed around the inspection target 100. FIG. 1 illustrates an example in which three sets are disposed. A first set is constituted by a first terahertz light source 111 and a first terahertz-wave detecting device 112. A second set is constituted by a second terahertz light source 121 and a second terahertz-wave detecting device 122. A third set is constituted by a third terahertz light source 131 and a third terahertz-wave detecting device 132.

The inspection target 100 is not particularly limited, but humans and animals can be exemplified. The terahertz-wave detection system irradiates the inspection target 100 with terahertz waves, receives the terahertz waves transmitted through a cloth, a skin or the like and reflected, and acquires an image. As a result, dangerous items such as a gun, a knife, an explosive or the like, for example, inside the inspection target 100 can be detected.

Reflected waves of the terahertz waves emitted from the terahertz light source are detected by the terahertz-wave detecting device of the same set. That is, the terahertz waves (a solid-line arrow 113) emitted from the first terahertz light source 111 is emitted to the inspection target 100, and the reflected terahertz waves (a solid-line arrow 114) are detected by the first terahertz-wave detecting device 112. The terahertz waves (a solid-line arrow 123) emitted from the second terahertz light source 121 is emitted to the inspection target 100, and the reflected terahertz waves (a solid-line arrow 124) are detected by the second terahertz-wave detecting device 122. The terahertz waves (a solid-line arrow 133) emitted from the third terahertz light source 131 is emitted to the inspection target 100, and the reflected terahertz waves (a solid-line arrow 134) are detected by the third terahertz-wave detecting device 132.

In FIG. 1, the terahertz light source and the terahertz-wave detecting device are disposed so that the terahertz waves emitted from at least one terahertz light source or the waves reflected on the inspection target 100 are incident to the terahertz-wave detecting device of the set different from that of the terahertz light source. For example, the terahertz waves (a broken-line arrow 115) emitted from the first terahertz light source 111 are emitted to the second terahertz-wave detecting device 122, and the terahertz-waves (a broken-line arrow 125) emitted from the second terahertz light source 121 are emitted to the third terahertz-wave detecting device 132. These terahertz waves (115, 125) are terahertz waves which are not desired to be detected and inhibit accurate detection in a terahertz-wave detector.

Figure 2:
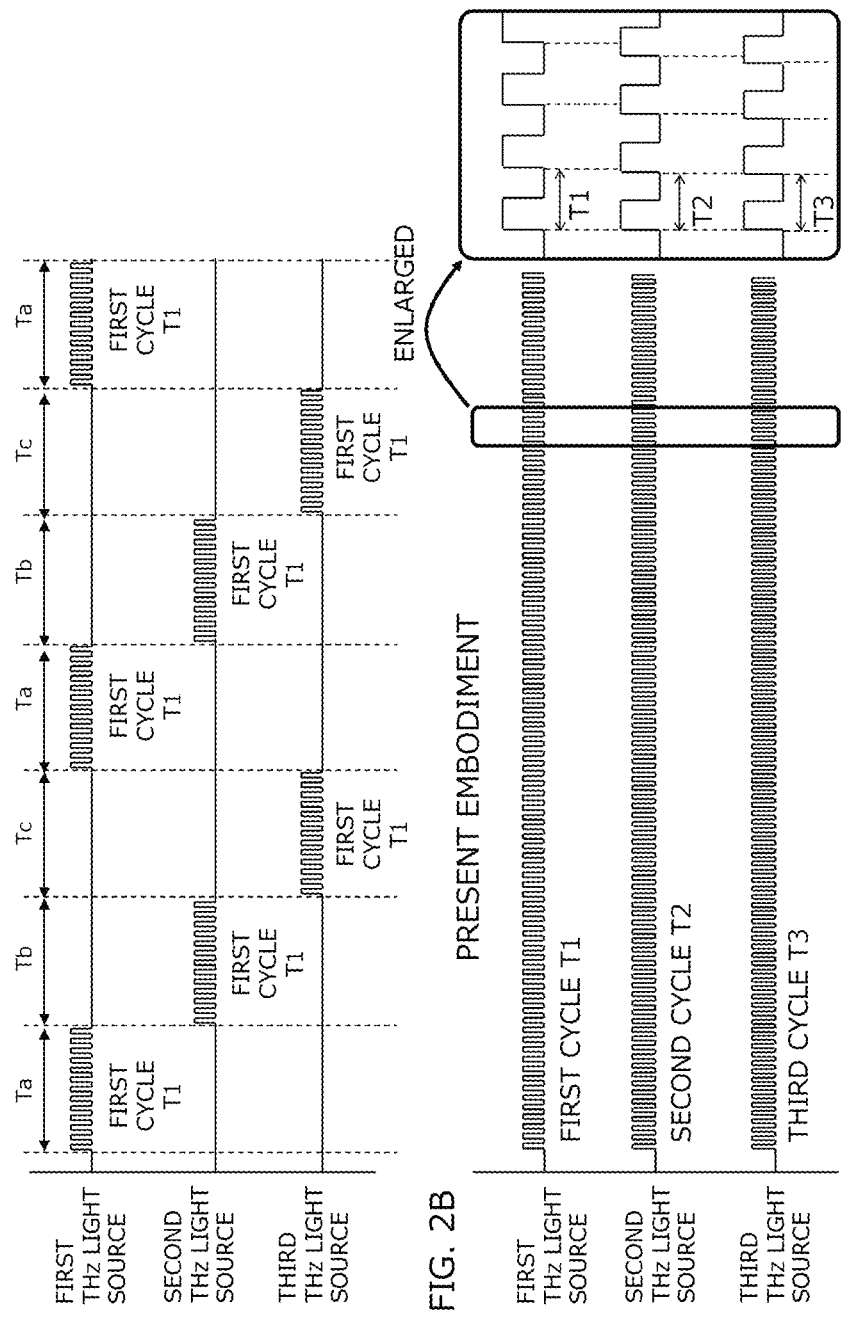
FIG. 2A and FIG. 2B are diagrams for explaining light-emission timing of a terahertz light source in a comparative example.

FIG. 2A is a diagram for explaining light-emission timing of the terahertz light source in a comparative example, and FIG. 2B illustrates the light-emission timing in this embodiment.

According to FIG. 2A, in a time period Ta in which the first terahertz light source 111 turns on/off light emission with a first cycle T1, the second terahertz light source 121 and the third terahertz light source 131 are in an off state. In a time period Tb in which the second terahertz light source 121 turns on/off the light emission with the first cycle T1, the first terahertz light source 111 and the third terahertz light source 131 are in the off state. In a time period Tc in which the third terahertz light source 131 turns on/off the light emission with the first cycle T1, the first terahertz light source 111 and the second terahertz light source 121 are in the off state. The terahertz-wave detecting device performs the detection operation in synchronization with the terahertz light source which turns on/off the light emission with the first cycle T1.

By emitting light as above, when the first terahertz-wave detecting device 112 performs a detection operation in the time period Ta, since the terahertz waves of the second terahertz light source 121 and the third terahertz light source 131 turn off the light emission, the terahertz waves are not detected by the first terahertz-wave detecting device 112. When the second terahertz-wave detecting device 122 performs a detection operation in the time period Tb, since the terahertz waves of the first terahertz light source 111 and the third terahertz light source 131 turn off the light emission, the terahertz waves are not detected by the second terahertz-wave detecting device 122. When the third terahertz-wave detecting device 132 performs a detection operation in the time period Tc, since the terahertz waves of the first terahertz light source 111 and the second terahertz light source 121 turn off the light emission, the terahertz waves are not detected by the third terahertz-wave detecting device 132.

Therefore, by means of the operation in the comparative example shown in FIG. 2A, detection of the terahertz waves (the broken-line arrow 115, the broken-line arrow 125) by the terahertz-wave detecting device which is not desired to be detected as described by using FIG. 1 can be avoided. However, each of the terahertz light sources has a period of time when the light emission is off, and the detection by the terahertz-wave detecting device cannot be performed in that period of time.

Subsequently, an operation in this embodiment will be described by referring to FIG. 2B. In this embodiment, each of the terahertz light sources outputs terahertz waves in different on/off patterns, and each of the terahertz-wave detecting devices detects the terahertz waves in synchronization with the on/off pattern of the terahertz light source in the same set. In another expression, each of the terahertz light sources emits light in a flashing manner at a different frequency or cycle, and each of the terahertz-wave detecting devices detects the terahertz waves in synchronization with the flashing light emission of the terahertz light source in the same set. The on/off pattern can be also considered to be a pattern of timing when the light source is brought into an on state and an off state. The on state of the light source is a state where the light source emits light, while the off state of the light source is a state where the light source is not emitting light.

Specifically, the first terahertz light source 111 emits light in a first on/off pattern of the first cycle T1, the first terahertz-wave detecting device 112 is synchronized with the on/off pattern in the first cycle T1 of the first terahertz light source 111 and detects the terahertz waves. Similarly, the second terahertz light source 121 emits light in a second on/off pattern of a second cycle T2, the second terahertz-wave detecting device 122 is synchronized with the on/off pattern in the second cycle T2 of the second terahertz light source 121 and detects the terahertz waves. Moreover, the third terahertz light source 131 emits light in a third on/off pattern of the third cycle T3, the third terahertz-wave detecting device 132 is synchronized with the on/off pattern in the third cycle T3 of the third terahertz light source 131 and detects the terahertz waves. The detection operation will be described later in [Circuit Configuration and Operation Thereof]. In this embodiment, the first cycle T1, the second cycle T2, and the third cycle T3 are all values different from one another, and no cycle is integer times of another.

As described above, in this embodiment, the light emission of the terahertz light source and the detection of the terahertz-wave detector in the same set are performed in the same on/off pattern, while they are performed in the different on/off pattern in the different sets. As a result, the terahertz waves from the terahertz light source of one set are not detected by the terahertz-wave detector of another set and thus, it can be so configured that the terahertz waves not desired to be detected (the broken-line arrow 115 and the broken-line arrow 125 in FIG. 1) are not detected. The reasons for that will be described later in the column of [Description of Actions of This Embodiment].

In this embodiment, it can be configured such that the terahertz waves from the terahertz light source of the different set are not detected and thus, all the sets can perform the light emission and the detection at the same time. Therefore, unlike the comparative example in FIG. 2A, there is no time period when the light emissions of the first terahertz light source 111, the second terahertz light source 121, and the third terahertz light source 131 are off, and they can be detected by the terahertz-wave detecting device at all times. Thus, S/N of a detected signal output is improved, and detection accuracy becomes better.

Overall Configuration of Terahertz-Wave Detecting Device

Figure 3:
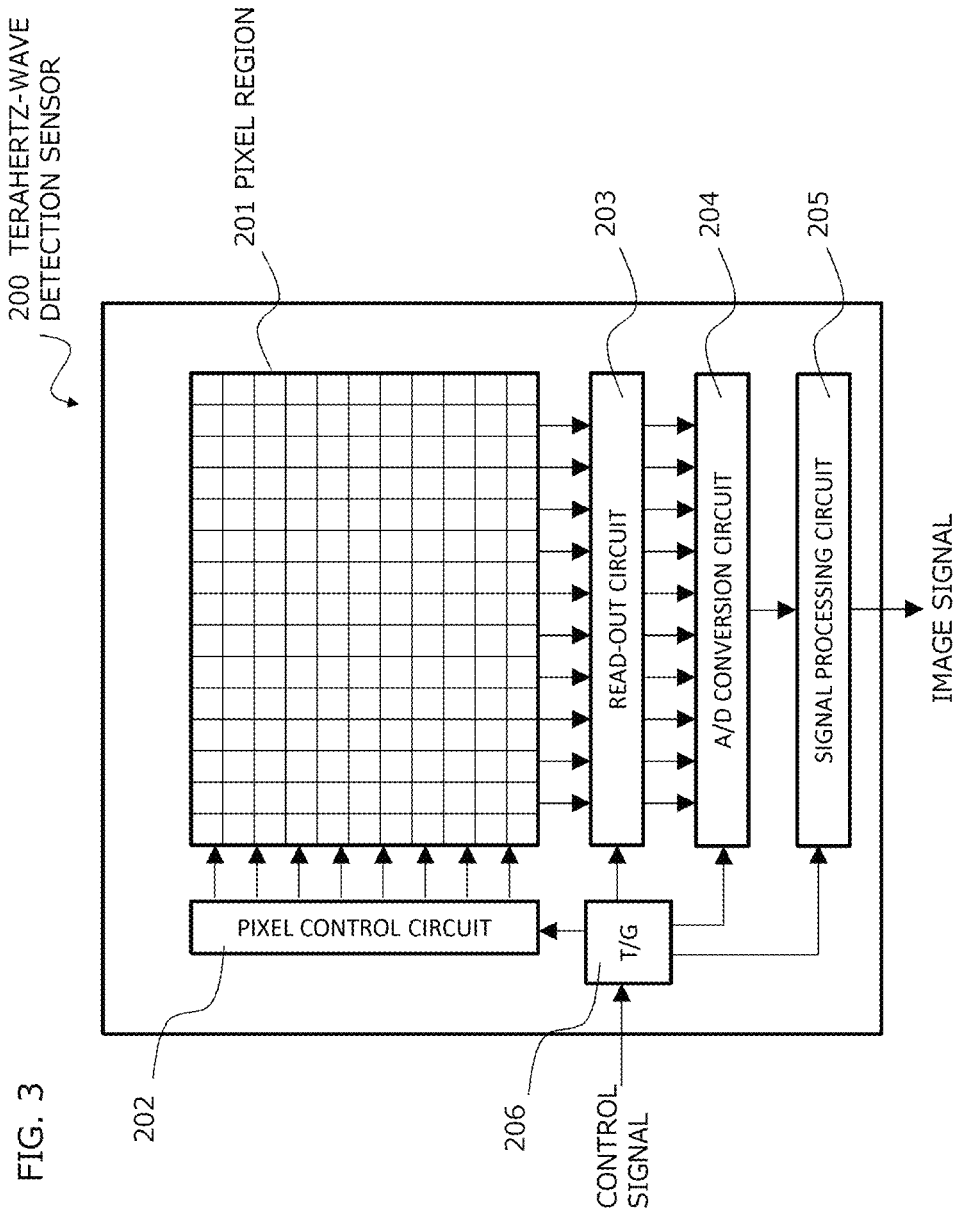
FIG. 3 is a block diagram of a terahertz-wave detection sensor according to this embodiment.

FIG. 3 is a block diagram of a terahertz-wave detection sensor 200 constituting the terahertz-wave detecting device according to this embodiment.

The terahertz-wave detection sensor 200 includes a pixel region 201, a pixel control circuit 202, a read-out circuit 203, an A/D conversion circuit 204, a signal processing circuit 205, and a timing generator (T/G) 206. The pixel control circuit 202, the read-out circuit 203, the A/D conversion circuit 204, the signal processing circuit 205, and the timing generator (T/G) 206 are included in a peripheral circuit region which is a region other than the pixel region 201.

In the pixel region 201, at least 1 and a large number of pixels are aligned in a matrix state (two-dimensional state). From the pixel control circuit 202, a control signal which drives each pixel disposed in the pixel region 201 is output. In the read-out circuit 203, a column amplifier, a correlated double sampling (CDS) circuit and the like are provided, and noise cancelling correction, signal amplification and the like are executed for the pixel signal read out of the pixel in a line selected by the pixel control circuit 202 via a signal read-out line. The A/D conversion circuit 204 converts a pixel signal from the read-out circuit 203, which is an analog signal, to a digital signal. The signal processing circuit 205 calculates the digital signal from the A/D conversion circuit 204 and executes offset adjustment, gain adjustment, gamma correction or noise reduction processing. The timing generator (T/G) 206 receives a control signal such as a synchronization signal and a clock signal from external control controllers (not shown) and outputs a control signal which drives the pixel control circuit 202, the read-out circuit 203, the A/D conversion circuit 204, and the signal processing circuit 205.

Circuit Configuration and Operation Thereof

Figure 4:
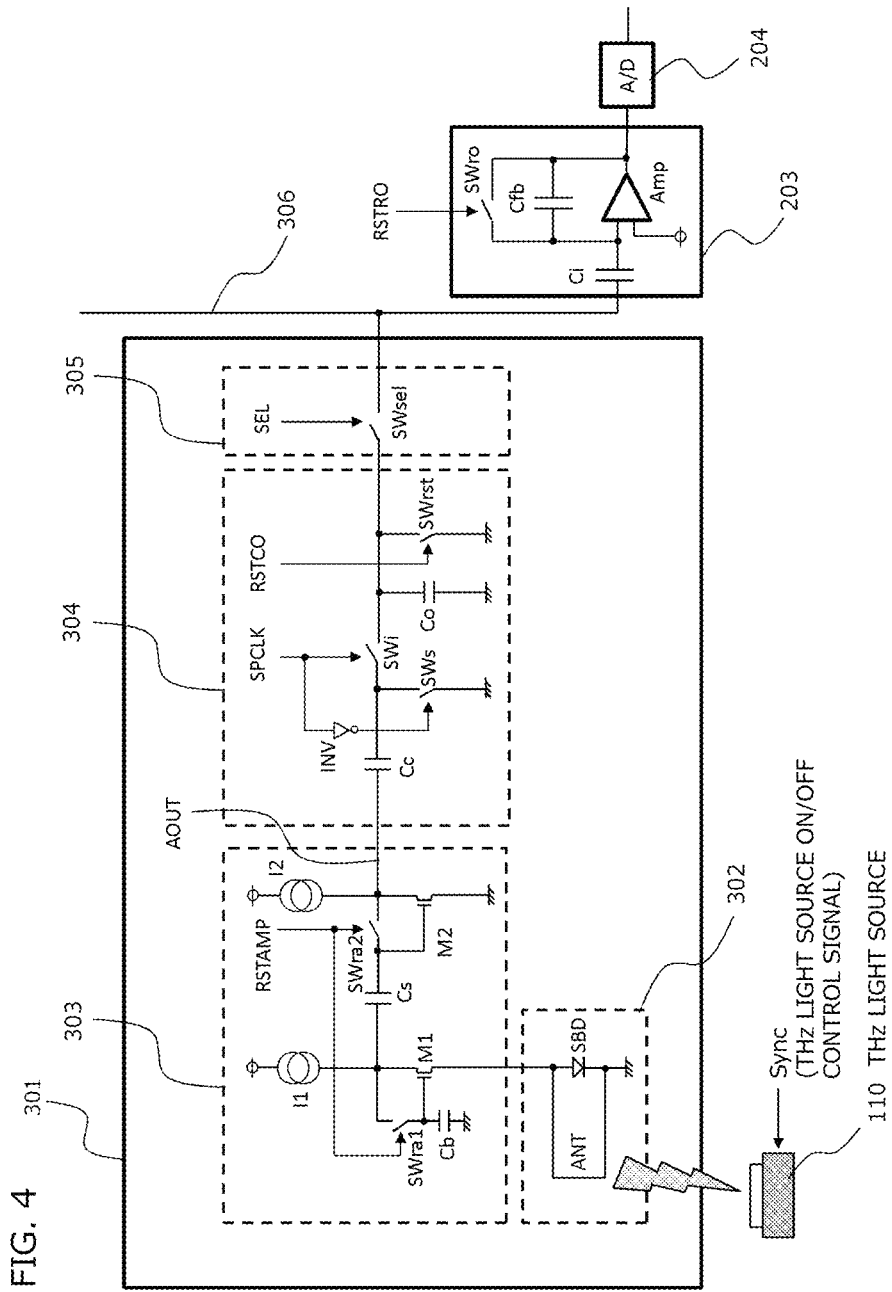
FIG. 4 is an example of a pixel circuit constituting each pixel of a pixel region according to this embodiment.

FIG. 4 is an example of a pixel circuit 301 constituting each pixel of the pixel region 201. The pixel circuit 301 is constituted by a terahertz-wave detection portion 302, a signal amplification portion 303, a signal accumulation portion 304, and a selection portion 305.

The terahertz-wave detection portion 302 detects a terahertz wave and generates a voltage signal. For example, it is constituted by a diode SBD and an antenna ANT. As the diode SBD, a schottky barrier diode can be used. As the antenna ANT, a linear antenna such as a loop antenna, a dipole antenna, a meander line antenna and the like and a planar patch antenna and the like can be used. In the antenna ANT which receives the terahertz waves, an electric current flows in accordance with intensity of the terahertz waves, and as a voltage across terminals of the diode SBD is changed, the terahertz-wave detection portion 302 can generate the voltage signal corresponding to the intensity of the terahertz waves.

The terahertz waves are emitted from the terahertz light source 110. On/off of the light emission of the terahertz light source 110 is controlled by a control signal Sync. The control signal Sync is generated in an external control controller (not shown) and is input into the terahertz light source 110. Alternatively, the control signal Sync may be generated in the timing generator (T/G) 206 of the terahertz-wave detection sensor 200.

The signal amplification portion 303 amplifies the voltage signal detected by the terahertz-wave detection portion 302 and inputs it in the signal accumulation portion 304. The voltage signal detected by the terahertz-wave detection portion 302 may be input as it is into the signal accumulation portion 304, but by amplifying the signal, an influence of a noise in circuits after the signal accumulation portion 304 is more suppressed, and S/N can be improved. As the signal amplification portion 303, a gate-ground amplification circuit or a source-ground amplification circuit is suitably used.

In the example in FIG. 4, an output of the terahertz-wave detection portion 302 is connected to a source terminal of an NMOS transistor M1, and a current source I1 is connected to a drain terminal of the NMOS transistor M1. Moreover, a switch SWra1 is connected between a gate terminal and the drain terminal of the NMOS transistor M1. By turning on the switch SWra1 so as to short-circuit the gate terminal and the drain terminal, the gate terminal is reset to a voltage determined in accordance with the electric current flowing through the NMOS transistor M1. This reset voltage depends on a threshold-value voltage and a driving capacitor of the NMOS transistor M1 and acts so as to cancel variation of the NMOS transistor M1 for each pixel. To the gate terminal of the NMOS transistor M1, a bias capacitor Cb is connected and acts so as to hold the reset voltage when the switch SWra1 is off. The circuit connection of the NMOS transistor M1 as above constitutes a gate-ground amplification circuit in which the source terminal of the NMOS transistor M1 is an input terminal, and the drain terminal is an output terminal.

Moreover, the source of the NMOS transistor M1 is connected to an anode of the diode SBD in the terahertz-wave detection portion 302, and the electric current of the current source I1 is used as a driving current of the diode SBD. According to the configuration as above, the bias current of the NMOS transistor M1 of the gate-ground amplification circuit and the driving current of the diode SBD are shared, and current consumption of the pixel circuit 301 can be reduced.

The drain terminal of the NMOS transistor M1 is connected to the gate terminal of an NMOS transistor M2 via a capacitor Cs. The source terminal of the NMOS transistor M2 is connected to a ground potential, and the drain terminal of the NMOS transistor M2 is connected to a current source I2. A switch SWra2 is connected between the gate terminal and the drain terminal of the NMOS transistor M2. By turning on the switch SWra2 so as to short-circuit the gate terminal and the drain terminal, the gate terminal is reset to a voltage determined in accordance with the electric current flowing through the NMOS transistor M2. This reset voltage depends on a threshold-value voltage and a driving capacity of the NMOS transistor M2 and acts so as to cancel variation of the NMOS transistor M2 for each pixel. Note that, in the example in FIG. 4, a control signal RSTAMP controls both the switch SWra1 and the switch SWra2, but the switch SWra1 and the switch SWra2 may be controlled by separate control signals.

By circuit connection of the NMOS transistor M2, a source-ground amplification circuit in which the gate terminal of the NMOS transistor M2 is an input terminal and the drain terminal is an output terminal is constituted. As a result, an output from the gate-ground amplification circuit by the NMOS transistor M1 is inverted and amplified by the source-ground amplification circuit by the NMOS transistor M2.

The signal amplification portion 303 only needs to amplify the voltage signal from the terahertz-wave detection portion 302, and amplification circuits other than the gate-ground amplification circuit or the source-ground amplification circuit described in this embodiment can be also applied.

The output of the signal amplification portion 303 is input into the signal accumulation portion 304. It may be so configured that a high-frequency cut filter (not shown) is disposed in an output portion of the signal amplification portion 303 so that a noise in the signal from the signal amplification portion 303 is eliminated. As the high-frequency cut filter, a capacitor can be used, for example, and is connected between the output portion of the signal amplification portion 303 and a fixed potential. It may be so configured that a plurality of capacitors are switched by a selection switch so that a cut-off frequency of the filter can be changed.

The signal accumulation portion 304 generates a differential voltage signal between an output voltage signal from the signal amplification portion 303 at one timing and the output voltage signal from the signal amplification portion 303 at a timing different from the above. And by performing an operation to accumulate the voltage determined by the differential voltage signal, an integral operation is performed by repeating the operation.

In the example in FIG. 4, the output of the signal amplification portion 303 is connected to one end of a clamp capacitor Cc in the signal accumulation portion 304. The other end of the clamp capacitor Cc is connected to one end of a switch SWs and one end of a switch SWi in common. The other end of the switch SWs is connected to the fixed potential (ground potential in FIG. 4). The other end of the switch SWi is connected one end of a storage capacitor Co. The other end of the storage capacitor Co is connected to the fixed potential (ground potential in FIG. 4). One end of a switch SWrst is connected to the one end of the storage capacitor Co. The other end of the switch SWrst is connected to the fixed potential (ground potential in FIG. 4). The one end of the storage capacitor Co is an output of the signal accumulation portion 304 and is input into the selection portion 305.

The switch SWi is on/off controlled by a control signal SPCLK. The switch SWs is controlled by an inversion signal of the control signal SPCLK. That is, when the switch SWi is on, the switch SWs is off, while to the contrary, when the switch SWs is on, the switch SWi is off. It is preferable that, when on and off of the switch SWi and the switch SWs are switched, driving is performed so that there is a period during which both the switch SWi and the switch SWs are off so as not to turn on both the switch SWi and the switch SWs. Moreover, the switch SWrst is on/off controlled by a control signal RSTCO and acts so as to reset the voltage on the one end of the storage capacitor Co.

The selection portion 305 acts so as to output a voltage of the storage capacitor Co in the signal accumulation portion 304 as the pixel signal to a signal read-out line 306, when a selection signal SEL is input. To the signal read-out line 306, outputs of the pixel circuits 301 on the same column disposed in the pixel region 201 are connected in common. The pixel circuit 301 is selected by the selection portion 305 sequentially for each line, and the pixel signal is output.

The signal read-out line 306 is connected to the read-out circuit 203. The read-out circuit 203 includes an amplification circuit Amp, an input capacitor Ci, a feedback capacitor Cfb, and a switch SWro for each column. The signal read-out line 306 is input into a first input terminal of the amplification circuit Amp via the input capacitor Ci. The feedback capacitor Cfb is connected between the first input terminal and an output terminal of the amplification circuit Amp. Moreover, by turning on the switch SWro, the two terminals of the feedback capacitor Cfb are connected and reset. The switch SWro is controlled by a control signal RSTRO. The fixed potential is input into a second input terminal of the amplification circuit Amp. By the configuration of the read-out circuit 203 as above, a noise is cancelled from the pixel signal, and the pixel signal can be amplified.

The output of the read-out circuit 203 is input into the A/D conversion circuit 204, and the pixel signal from the read-out circuit 203, which is an analog signal, is converted to a digital signal. The A/D conversion circuit 204 may be provided for each column, or one unit of the A/D conversion circuit 204 may be disposed for all the columns for A/D conversion in a time-division manner for each column.

Explanation of Detection Operation

Figure 5:
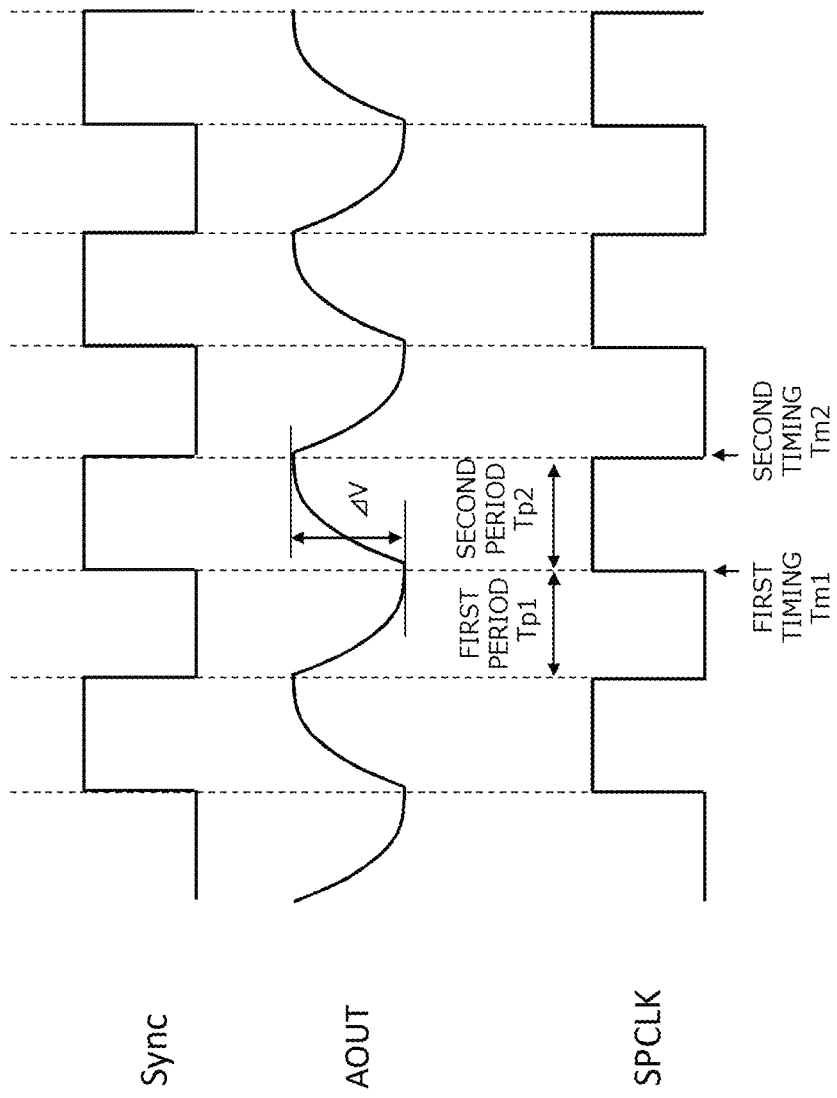
FIG. 5 is a diagram for explaining an operation of a signal accumulation portion according to this embodiment.

A detection operation of the terahertz-wave detecting device will be described in detail by referring to FIG. 5. FIG. 5 is an example of a timing chart for explaining an operation of the signal accumulation portion 304.

In FIG. 5, the control signal Sync is a control signal which turns on/off the light emission of the terahertz light source, and H level/L level is repeated with a certain cycle. In this embodiment, it is assumed that the terahertz light source emits light at the H level.

The control signal SPCLK is a signal which controls the switch SWi, and H level/L level is repeated with a certain cycle in synchronization with the control signal Sync. In this embodiment, it is assumed that the switch SWi is turned on at the H level. Thus, the switch SWs is turned on when the control signal SPCLK is at the L level. The synchronization is executed such that, when the control signal Sync is at the H level, the control signal SPCLK is also at the H level, and when the control signal Sync is at the L level, the control signal SPCLK is also at the L level.

An output waveform AOUT is an output voltage signal of the signal amplification portion 303. A rise and a fall of the output waveform AOUT is interlocked with on/off of the light emission of the terahertz light source. Since the terahertz light source emits light when the control signal Sync is at the H level, the terahertz waves are detected by the terahertz-wave detection portion 302, and a voltage signal is generated, and the voltage signal is amplified by the signal amplification portion 303 and is output. Therefore, when the control signal Sync becomes the H level, the output waveform AOUT rises, and the voltage increases to a level corresponding to intensity of the terahertz waves. When the control signal Sync is at the L level, the light emission of the terahertz light source is turned off and thus, the terahertz waves are not detected by the terahertz-wave detection portion 302, the output waveform AOUT falls, and the voltage lowers to such an output level that the light emission of the terahertz waves is off.

In this specification, a period during which the control signal SPCLK is at the L level is referred to as a first time period Tp1, and a period at the H level is referred to as a second time period Tp2. Moreover, a timing when the first time period Tp1 is switched to the second time period Tp2 is referred to as a first timing Tm1, and a timing when the second time period Tp2 is switched to the first time period Tp1 is referred to as a second timing Tm2.

An operation of the signal accumulation portion 304 will be described by using FIG. 4 and FIG. 5.

First, a first operation performed in the first time period Tp1 will be described. In the first time period Tp1, the light emission of the terahertz light source is off since the control signal Sync is at the L level, and the output waveform AOUT is also lowered. The output waveform AOUT when the light emission of the terahertz light source is off is applied to the one end of the clamp capacitor Cc, and since the switch SWs is on, the fixed potential (ground potential) is applied to the other end of the clamp capacitor Cc.

When the control signal SPCLK is switched from the L level to the H level at the first timing Tm1, the switch SWs is turned off, and the switch SWi is turned on and thus, the other end of the clamp capacitor Cc is connected to the one end of the storage capacitor Co. The inter-terminal voltage of the clamp capacitor Cc at this time is holds a potential difference between the voltage signal (first voltage signal) of the output waveform AOUT at the first timing Tm1 and the fixed potential (ground potential).

Subsequently, a second operation performed in the second time period Tp2 will be described. In the second time period Tp2, since the control signal Sync is at the H level, the terahertz light source emits light, and the output waveform AOUT is increased. This output waveform AOUT is applied to the one end of the clamp capacitor Cc, and the other end of the clamp capacitor Cc is connected to the one end of the storage capacitor Co and thus, the voltage of the storage capacitor Co is also increased by a voltage increase of the output waveform AOUT. Assuming that a voltage increase portion of the output waveform AOUT is $\Delta V$, a voltage increase portion $\Delta V'$ of the storage capacitor Co (hereinafter, referred to as a storage voltage $\Delta V'$) is expressed by $\Delta V' = \Delta V \times Cc/(Co+Cc)$ by multiplying a capacitance division ratio of the clamp capacitor Cc and the storage capacitor Co, which is a voltage value in correlation with $\Delta V$. Here, Cc is a capacitance value of the clamp capacitor Cc, and Co is a capacitance value of the storage capacitor Co.

At the second timing Tm2, when the control signal SPCLK is switched from the H level to the L level, and the switch SWi connecting the clamp capacitor Cc and the storage capacitor Co is turned off, the voltage increase portion $\Delta V$ is finalized. Assuming that the voltage signal of the output waveform AOUT at this second timing Tm2 is a second voltage signal, the voltage increase portion $\Delta V$ is a differential voltage signal between the first voltage signal and the second voltage signal.

As described above, a series of operations consisting of the first operation and the second operation are one session of an accumulation operation and an operation in which the differential voltage signal $\Delta V$ between the first voltage signal and the second voltage signal is generated, and the storage voltage $\Delta V'$ obtained by capacitance-dividing the differential voltage signal $\Delta V$ is accumulated in the storage capacitor Co.

This accumulation operation is repeated several times. When the accumulation operation is repeated N times, the voltage of the storage capacitor Co is increased by $N \times \Delta V'$ portion. N is the number of accumulation times, and this operation is an integral operation for accumulating the storage voltage $\Delta V'$ N times. Moreover, the voltage of this storage capacitor Co is read out as a pixel signal.

In this embodiment, the first time period Tp1 and the second time period Tp2 are described in FIG. 5 to have the same length (duty ratio is 50%), but they may have different lengths. A suitable duty ratio range is from 30% to 70%. Moreover, the rise/fall timing of the control signal SPCLK is described to be the same timing as the rise/fall timing of the control signal Sync, but the timing may be made different by giving consideration to a delay caused by a configuration of a drive circuit and a parasitic impedance.

When the voltage of the output waveform AOUT at the first timing Tm1 (first voltage signal) is the minimum voltage, and the voltage of the output waveform AOUT at the second timing Tm2 (second voltage signal) is the maximum voltage, the differential voltage signal $\Delta V$ becomes the largest. Therefore, an optimal condition in view of the S/N is to have a timing when the output waveform AOUT takes the minimum voltage as the first timing Tm1 and a timing when the output waveform AOUT takes the maximum voltage as the second timing Tm2. However, in order to acquire the differential voltage signal $\Delta V$ by detecting the terahertz waves emitted from the terahertz light source by the terahertz-wave detecting device, the first timing Tm1 and the second timing Tm2 do not have to be as above. The first timing Tm1 only needs to be a time period during which the light emission by the terahertz light source is off, and the second timing Tm2 only needs to be a time period during which the terahertz light source emits light. Thus, the signal accumulation portion 304 acts such that the storage voltage $\Delta V'$ determined by the differential voltage signal $\Delta V$ between the output voltage signal converted at the timing when the light emission by the terahertz light source is off and the output voltage signal converted at the timing when the terahertz light source emits light is integrated.

In this embodiment, the differential voltage signal $\Delta V$ is generated by the signal accumulation portion 304 constituted by the capacitor and the switch, but the differential voltage signal ΔV may be generated by a method other than that. For example, such a method can be cited that the first voltage signal and the second voltage signal are A/D-converted and stored in the memory, respectively, and the differential signal is calculated by digital signal processing. And integration can be performed by storing the differential signals in the memory and adding them sequentially.

As described above, the detection operation of the terahertz-wave detecting device in this embodiment is an operation for acquiring a pixel signal by the integration operation of repeatedly accumulating the storage voltage ΔV' determined by the differential voltage signal ΔV between the first timing Tm1 and the second timing Tm2.

Driving Method of Terahertz-Wave Detecting Device

Figure 6:
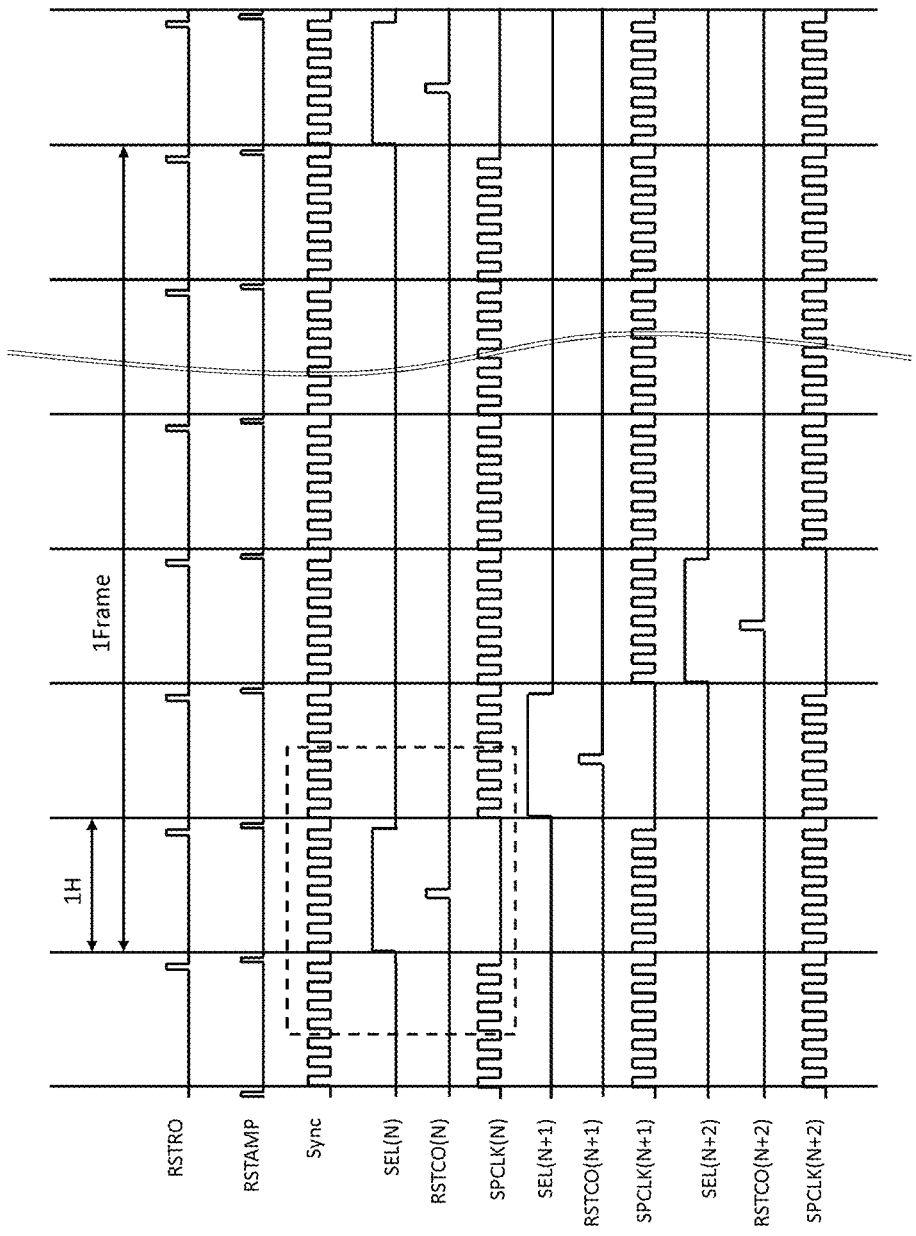
FIG. 6 is a diagram for explaining a driving method of the terahertz-wave detecting device according to this embodiment.

FIG. 6 is a timing chart for explaining a driving method of the terahertz-wave detecting device (terahertz-wave detection sensor) in this embodiment. Regarding the plurality of pixels aligned in the matrix state (two-dimensional state), the output signal of the pixel is sequentially read out for each line and thus, the control signals SEL, RSTCO, and SPCLK shown in FIG. 4 are supplied in common to the pixel circuit 301 in each line. In FIG. 6, SEL(N), RSTCO(N), SPCLK(N) are supplied to the pixel circuit on the N-th line. SEL(N+1), RSTCO(N+1), SPCLK(N+1) are supplied to the pixel circuit on the N+1-th line. SEL(N+2), RSTCO(N+2), SPCLK(N+2) are supplied to the pixel circuit on the N+2-th line.

Figure 7:
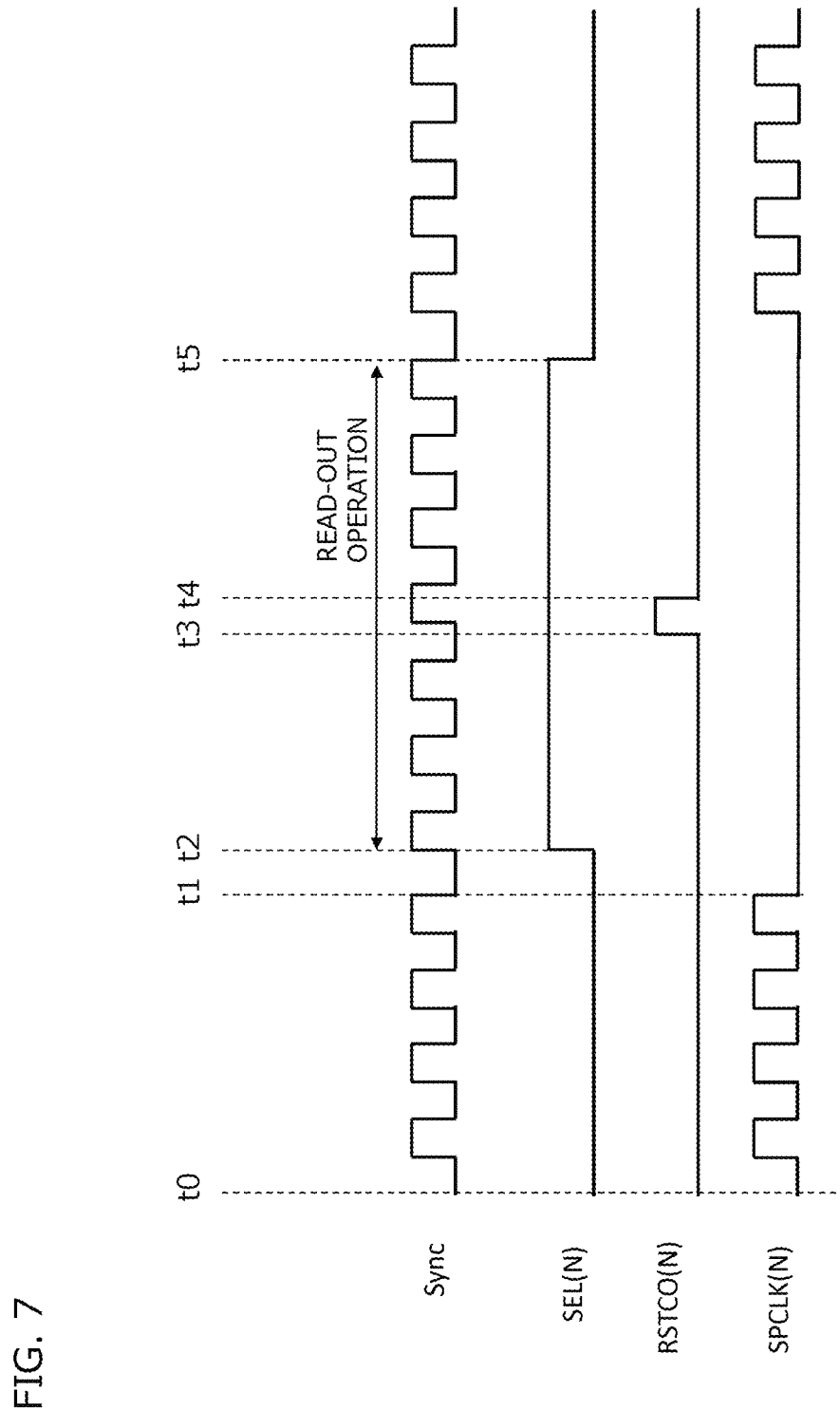
FIG. 7 is a diagram for explaining an operation of the pixel circuit on an N-th line according to this embodiment.

FIG. 7 is a timing chart for explaining an operation of the pixel circuit on the N-th line. A region surrounded by a broken line in FIG. 6 is enlarged, and waveforms of the control signals Sync, SEL(N), RSTCO(N), and SPCLK(N) are shown. First, by using FIG. 7, the operation of the pixel circuit on the N-th line will be described.

The control signal Sync is a signal which controls on/off of the light emission of the terahertz light source 110, and the H level and the L level are repeated with a certain cycle.

Time t0 is arbitrary time when the accumulation operation described by using FIG. 5 is being performed. The accumulation operation is performed until time t1, and the H level and the L level of the control signal SPCLK(N) are repeated in synchronization with the control signal Sync.

When the SPCLK(N) is at the H level, the first operation described by using FIG. 5 is performed. The timing when the SPCLK(N) is switched from the L level to the H level corresponds to the first timing Tm1, and the output voltage (corresponding to the first voltage signal described above) of the signal amplification portion 303 is held in the clamp capacitor Cc at this time.

When the SPCLK(N) is at the L level, the second operation described by using FIG. 5 is performed. The timing when the SPCLK(N) is switched from the H level to the L level corresponds to the second timing Tm2. The storage voltage ΔV' obtained by capacitance-dividing the differential voltage signal ΔV of the output voltages of the signal amplification portion 303 at each of the first timing Tm1 and the second timing Tm2 is accumulated in the storage capacitor Co.

Subsequently, at time t2, the control signal SEL(N) becomes the H level, a switch SWse1 is turned on, and the voltage of the storage capacitor Co is output as a pixel signal to the signal read-out line 306. During a time period from the time t2 to time t3, the pixel signal of the pixel circuit 301 is read out by the read-out circuit 203.

At the time t3, the control signal RSTCO becomes the H level, the switch SWrst is turned on, and the voltage of the storage capacitor Co is reset to a fixed voltage (ground potential in FIG. 4).

At time t4, the control signal RSTCO becomes the L level, the switch SWrst is turned off, and the reset voltage is held in the storage capacitor Co.

In a time period from the time t4 to time t5, the voltage held in the storage capacitor Co of the read-out circuit 203 is read out as a reset signal. The read-out circuit 203 generates a differential signal between the pixel signal read out in the time period from the time t1 to the time t2 and the reset signal read out in the time period from the time t3 to the time t4 and cancels a noise. The read-out circuit 203 amplifies the differential signal by the amplification circuit Amp and outputs it to the A/D conversion circuit 204 in a rear stage.

At the time t5, the control signal SEL becomes L, and the switch SWse1 is turned off. In this series of operations, the operation performed in the time period from the time t2 to the time t5 when the control signal SEL is at the H level is assumed to be a reading operation of a pixel. In this time period of reading operation, the control signal Sync repeats the H level and the L level with the certain cycle, but SPCLK(N) is fixed to the L level and thus, the storage capacitor Co holds a fixed voltage.

After the time t5, the accumulation operation is performed again similarly to the time period from the time t0 to the time t1, and the operation described above is repeated.

The operation of the entire pixel region will be described by using FIG. 6. It is assumed that a time period since the control signal SEL(N) on the N-th line becomes the H level until the control signal SEL(N+1) on the N+1-th line, which is the subsequent line, becomes the H level is a 1-line scanning period (1H). After the read-out operation of the N-th line, the read-out operation of the N+1-th line is performed in the subsequent 1-line scanning period. Subsequently, after the read-out operation of the N+1-th line, the read-out operation of the N+2-th line is performed in the subsequent 1-line scanning period. The driving is performed such that the pixel signal is sequentially read out for each line as described above. In a period during which the read-out operation is not performed for each line, the accumulation operation is performed. A period during which the read-out operation is sequentially performed for each line, and the read-out operation of the same line is performed again is assumed to be a 1-frame period (1Frame).

The control signal RSTRO is a signal which resets the read-out circuit 203 disposed in each line. There is one H-level period in the 1-line scanning period, and the read-out circuit 203 of each column is reset in the H-level period. In the read-out operation of the pixel on each line, the H-level period is provided after a reset signal accumulated in the storage capacitor Co is read out. By resetting the read-out circuit 203 at this timing, the signal read-out line 306 is fixed to the reset signal and thus, the read-out operation can be performed without being affected by the pixel signal on the pervious line.

The control signal RSTAMP is a signal which resets the signal amplification portion 303 of the pixel circuit 301. In this embodiment, it is input into all the pixel circuits 301 of the pixel region 201 in common, and there is one H-level period in each 1-line scanning period. In the H-level period, the signal amplification portion 303 is reset. The timing when the H-level of the control signal RSTAMP is input is preferably when the control signals SPCLK(N), SPCLK(N+1), and SPCLK(N+2) are at the L level so that the terahertz waves are normally detected and converted to voltage signals. Regarding the control signal RSTAMP, it may be an operation in which the H level is input only once in the 1-Frame period. Moreover, the control signals SPCLK(N), SPCLK(N+1), and SPCLK(N+2) repeat the H level and the L level in the accumulation operation, but inputs may be made in each of the L-level periods. Alternatively, similarly to the control signals SEL, RSTCO, and SPCLK, supply may be made to the pixel circuit in common for each line in a form such as RSTAMP(N) on the N-th line, RSTAMP(N+1) on the N+1-th line, RSTAMP(N+2) on the N+2-th line and the like. In this case, the H level of the control signal RSTAMP on that line is input before the accumulation operation after the read-out operation for each line.

Explanation of Action of this Embodiment

Figure 8:
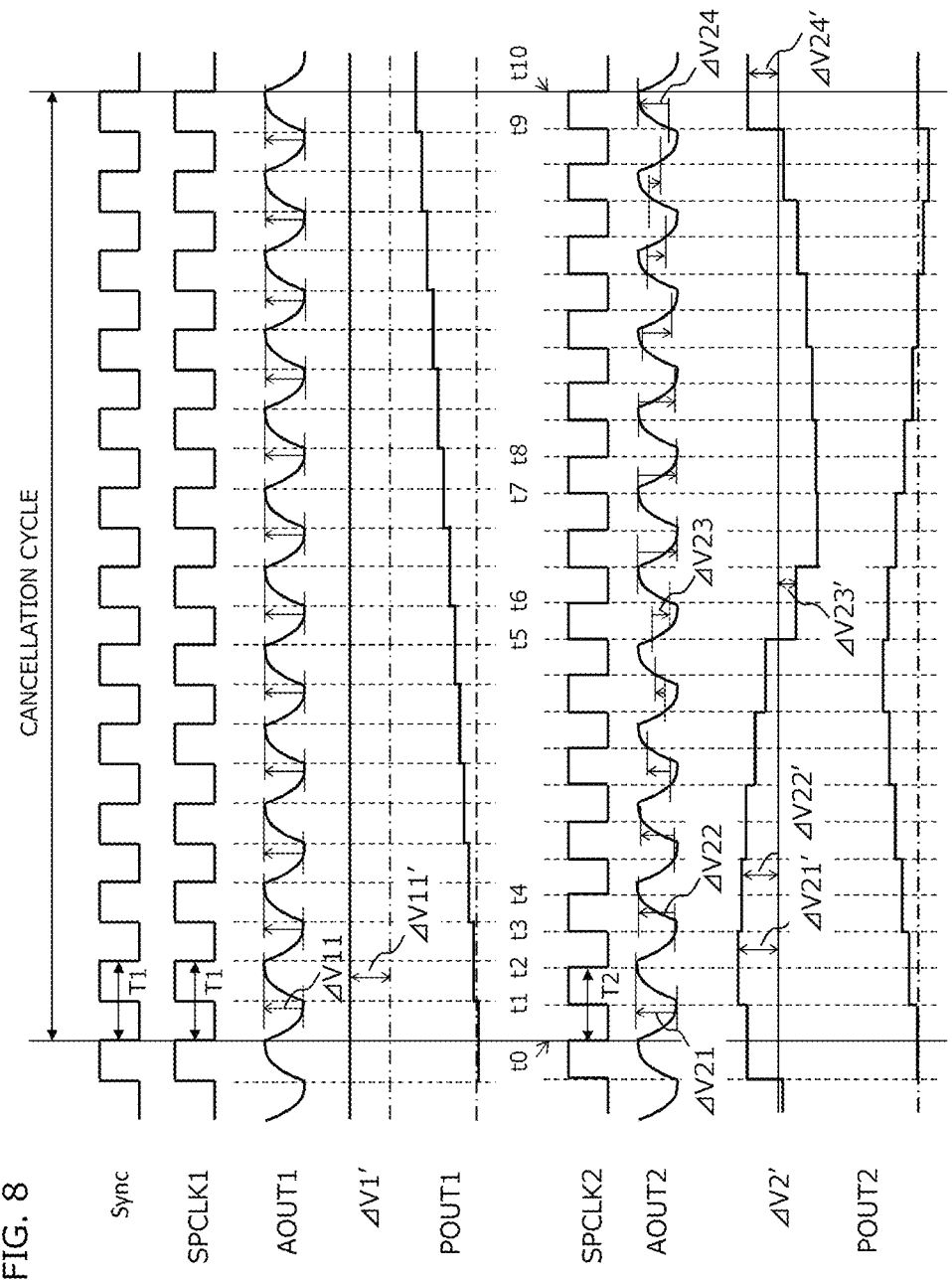
FIG. 8 is a diagram for explaining an effect by this embodiment.

FIG. 8 is a timing chart for explaining an action of this embodiment. According to FIG. 1, the terahertz waves (the solid-line arrow 113) emitted from the first terahertz light source 111 is reflected by the inspection target 100, and the reflected terahertz waves (the solid-line arrow 114) are emitted to the first terahertz-wave detecting device 112. At the same time, the terahertz waves (the broken-line arrow 115) emitted from the first terahertz light source 111 are emitted to the second terahertz-wave detecting device 122. By using FIG. 8, an action of this embodiment that the output by the terahertz waves emitted from the first terahertz light source 111 can be cancelled to zero in the second terahertz-wave detecting device 122 will be described. A part of the waveform in FIG. 8 is simplified and described linearly.

Similarly to FIG. 5, the control signal Sync is a control signal which controls on/off of the light emission of the first terahertz light source 111, and the H level and the L level are repeated with the first cycle T1. The light is emitted at the H level, while the light emission is off at the L level.

A control signal SPCLK1 is a control signal which controls on/off of the switch SWi in the pixel circuit of the first terahertz-wave detecting device 112, and the H level and the L level are repeated with the first cycle T1 which is the same as that of the control signal Sync.

An output waveform AOUT1 is an output waveform of the signal amplification portion 303 of the pixel circuit of the first terahertz-wave detecting device 112. Similarly to the output waveform AOUT shown in FIG. 5, a rise and a fall of the output waveform AOUT1 are interlocked with on/off of the light emission of the first terahertz light source 111. Since the first terahertz light source 111 emits light when the control signal Sync is at the H level, the output waveform AOUT1 rises, and the voltage increases to a level corresponding to intensity of the terahertz waves. When the control signal Sync is at the L level, the light emission of the first terahertz light source 111 is turned off and thus, the output waveform AOUT1 falls, and the voltage lowers to such an output level that the terahertz waves are off.

A storage voltage $\Delta V1'$ indicates a voltage which is changed by one session of the accumulation operation for the storage capacitor Co in the signal accumulation portion 304 of the first terahertz-wave detecting device 112. An output waveform POUT1 indicates a voltage of the storage capacitor Co in the signal accumulation portion 304 accumulated by the integral operation of the first terahertz-wave detecting device 112.

Since the control signal Sync and the control signal SPCLK1 are synchronized with the same first cycle T1, voltages (corresponding to the aforementioned first voltage signal) of the output waveforms AOUT1 at the rise of the control signal SPCLK1 (first timing Tm1 in FIG. 5) have the same value in any cycle. Similarly, the voltages (corresponding to the aforementioned second voltage signal) of the output waveform AOUT1 at the fall of the control signal SPCLK1 (second timing Tm2 in FIG. 5) have the same value in any cycle. Therefore, since the differential voltage signals between the two voltages in all the accumulation operation have the same value $\Delta V11$, the storage voltage $\Delta V1'$ is a fixed voltage $\Delta V11'$.

A voltage at a start point of an arrow described in the output waveform AOUT1 in FIG. 8 indicates the aforementioned first voltage signal, and a voltage at an end point of the arrow indicates the aforementioned second voltage signal. The length of the arrow indicates intensity of the differential voltage signal of the two voltages, and they are the same length in all the accumulation operations.

Thus, in the output waveform POUT1, a fixed certain voltage increases each time the accumulation operation is repeated by the integral operation.

The control signal SPCLK2 is a control signal which controls on/off of the switch SWi in the pixel circuit of the second terahertz-wave detecting device 122, and the H level and the L level are repeated with the second cycle T2 which is different from that of the control signal Sync. In this embodiment shown in FIG. 8, a case in which the second cycle T2 is smaller than the first cycle T1 will be described, but to the contrary, a similar effect can be obtained even when the second cycle T2 is larger than the first cycle T1.

The explanation using FIG. 8 is an example of the embodiment, and a 12-cycle portion of the control signal SPCLK1 and a 13-cycle portion of the control signal SPCLK2 are the same time period. In this disclosure, a cycle with a length of a least common multiple of the first cycle T1 and the second cycle T2 is defined to be a cancellation cycle. In this embodiment, it is only necessary that the cycle of the control signal SPCLK1 is different from the cycle of the control signal SPCLK2. More preferably, it is only necessary that the cycle of the control signal SPCLK1 is other than an integral multiple of the cycle of the control signal SPCLK2, and the cycle of the control signal SPCLK2 is other than an integral multiple of the cycle of the control signal SPCLK1.

The output waveform AOUT2 is an output waveform of the signal amplification portion 303 of the pixel circuit of the second terahertz-wave detecting device 122. Since the terahertz waves emitted from the first terahertz light source 111 are emitted also to the second terahertz-wave detecting device 122, the output waveform AOUT2 is similar to the output waveform AOUT1 and is interlocked with on/off of the light emission of the first terahertz light source 111. Since the first terahertz light source 111 emits light when the control signal Sync is at the H level, the output waveform AOUT2 rises, and the voltage increases to a level corresponding to the intensity of the terahertz waves. When the control signal Sync is at the L level, the light emission of the first terahertz light source 111 is turned off and thus, the output waveform AOUT2 falls, and the voltage lowers to such an output level that the terahertz waves are off.

The storage voltage $\Delta V2'$ indicates a voltage which is changed by one session of the accumulation operation for the storage capacitor Co in the signal accumulation portion 304 of the second terahertz-wave detecting device 122. An output waveform POUT2 indicates a voltage of the storage capacitor Co in the signal accumulation portion 304 accumulated by the integral operation of the second terahertz-wave detecting device 122.

Since the control signal Sync and the control signal SPCLK2 have different cycles, the differential voltage signal of the output waveform AOUT2 is changed for each accumulation operation. That is, the voltage (corresponding to the aforementioned first voltage signal) of the output waveform AOUT2 at the rise of the control signal SPCLK2 (first timing Tm1 in FIG. 5) has a different value in each cycle. Similarly, the voltage (corresponding to the aforementioned second voltage signal) of the output waveform AOUT2 at the fall of the control signal SPCLK2 (second timing Tm2 in FIG. 5) also has a different value in each cycle. Since the differential voltage signal of the two voltages is changed, a storage voltage $\Delta V2'$ has its voltage changed at each accumulation operation.

Similarly to the arrows of the output waveform AOUT1, a voltage at a start point of an arrow described in the output waveform AOUT2 in FIG. 8 indicates the aforementioned first voltage signal, and a voltage at an end point of the arrow indicates the aforementioned second voltage signal. The length of the arrow shows intensity of the differential voltage signal of the two voltages, and the length is changed at each accumulation operation. Moreover, directions of the arrows indicate positive/negative of the differential voltage.

At the time t0, the fall of the control signal SPCLK1 and the fall of the control signal SPCLK2 are the same timing and is assumed to be start time of the cancellation cycle.

A first rise timing of the control signal SPCLK2 counted from the time t0 is the time t1, and first fall timing is the time t2. A second rise timing of the control signal SPCLK2 counted from the time t0 is the time t3, and a second fall timing is the time t3.

The voltage of the output waveform AOUT2 at the time t3 corresponding to the first timing Tm1 in FIG. 5 increases from the time t1, and the voltage of the output waveform AOUT2 at the time t4 corresponding to the second timing Tm2 in FIG. 5 decreases from the time t2. Thus, a differential signal $\Delta V22$ of the output waveform AOUT2 at the time t3 and the time t4 is smaller than a differential voltage signal $\Delta V21$ of the output waveform AOUT2 at the time t1 and the time t2. Therefore, the storage voltage $\Delta V2'$ decreases.

In FIG. 8, a storage voltage corresponding to the differential voltage signal $\Delta V21$ is $\Delta V21'$, while the storage voltage corresponding to the differential voltage signal $\Delta V22$ is $\Delta V22'$, and the storage voltage $\Delta V22'$ is smaller than the storage voltage $\Delta V21'$.

And as the control signal SPCLK2 repeats the rise and the fall, the voltage of the output waveform AOUT2 at the first timing Tm1 increases, and the voltage of the output waveform AOUT2 at the second timing Tm2 decreases and thus, the differential voltage signal decreases. The decrease of the differential voltage signal is indicated by a fact that a length of an arrow indicating $\Delta V22$ in the figure is shorter than a length of an arrow indicating $\Delta V21$. As described above, with the decrease of the differential voltage signal, the storage voltage $\Delta V2'$ decreases at each accumulation operation.

Moreover, the voltage of the output waveform AOUT2 at time t6 (second timing Tm2 in FIG. 5) is smaller than the voltage of the output waveform AOUT2 at the time t5 (first timing Tm1 in FIG. 5), and a differential voltage signal $\Delta V23$ becomes negative and thus, the storage voltage $\Delta V2'$ becomes negative. At this time, directions of the arrows are opposite to those in the previous accumulation operation, which shows that the differential voltage becomes negative from positive.

In FIG. 8, the storage voltage corresponding to the differential voltage signal $\Delta V23$ is $\Delta V23'$, and the storage voltage $\Delta V23'$ is negative.

Then, the control signal SPCLK2 repeats the rise and the fall, and the voltage of the output waveform AOUT2 at time t7 corresponding to the first timing Tm1 decreases from the previous accumulation operation. On the other hand, the voltage of the output waveform AOUT2 at time t8 corresponding to the second timing Tm2 increases from the previous accumulation operation. Thus, the differential voltage signal changes to an increasing tendency, and the storage voltage $\Delta V2'$ increases. In the figure, the increase of the differential voltage is indicated by a length of the arrow indicating the negative differential voltage which has become shorter.

And as the control signal SPCLK2 repeats the rise and the fall, the voltage of the output waveform AOUT2 at the first timing Tm1 decreases, while the voltage of the output waveform AOUT2 at the second timing Tm2 increases, and the differential voltage signal increases. The length of the arrow indicating negative has become shorter. Therefore, the storage voltage $\Delta V2'$ increases at each accumulation operation.

Since the voltage of the output waveform AOUT2 at time t10 which is the second timing Tm2 has become larger than the voltage of the output waveform AOUT2 at time t9 corresponding to the first timing Tm1, and a differential voltage signal $\Delta V24$ is positive, the storage voltage $\Delta V2'$ becomes positive again. At this time, directions of the arrows are opposite to those in the previous accumulation operation, which shows that the differential voltage becomes positive from negative.

In FIG. 8, the storage voltage corresponding to the differential voltage signal $\Delta V24$ is $\Delta V24'$, and the storage voltage $\Delta V24'$ is positive.

With the operation as above, the storage voltage $\Delta V2'$ has a time period with a positive voltage and a time period with a negative voltage, and as indicated by the output waveform POUT2, by integrating the storage voltage $\Delta V2'$ by the cancellation cycle in the integral operation, zero is acquired. (It is zero at the time t0, and it is zero again also at the time t10.) Thus, the output by the terahertz waves from the first terahertz light source 111 detected by the second terahertz-wave detecting device 122 can be cancelled to zero.

In order to acquire detection data by cancelling the output by the unnecessary terahertz waves from the terahertz-wave detecting device, it is preferable that there is at least one session of the cancellation cycle in the 1-frame period (1Frame) or the 1-line scanning period (1H) shown in FIG. 6. Alternatively, it is preferable that the 1-frame period is a period of an integral multiple of the cancellation cycle or the 1-line scanning period is a period of an integral multiple of the cancellation cycle.

As described above, outputs of the terahertz waves of the first terahertz light source 111 which emits light in the on/off pattern with first cycle T1 can be acquired by the first terahertz-wave detecting device 112 which performs the accumulation operation with the first cycle T1. On the other hand, the second terahertz-wave detecting device 122 which performs the accumulation operation with the second cycle T2 cannot acquire the output of the terahertz waves of the first terahertz light source 111.

Moreover, the second terahertz light source 121 also emits light in synchronization with the second terahertz-wave detecting device 122, and on/off of the light emission is repeated with the second cycle T2. Even if the light of the second terahertz light source 121 is incident to the first terahertz-wave detecting device 112 at the same time, since the light emission and the accumulation operation are not synchronized, the output by the light of the second terahertz light source 121 is cancelled to zero in the first terahertz-wave detecting device 112.

Moreover, whatever the number of the sets of the terahertz light source and the terahertz-wave detecting device is, if the on/off cycle of the light emission and the cycle of the accumulation operation in the same set are synchronized, and the cycles are different among the sets, the aforementioned effect can be obtained. The terahertz light is detected only by the terahertz-wave detecting device which performs the accumulation operation in synchronization with the on/off pattern of the light emission by the terahertz light source. Therefore, by performing the accumulation operation of the terahertz-wave detecting device so as not to be synchronized with the on/off pattern of the unnecessary light emission by the terahertz-wave detecting device, an influence of the unnecessary terahertz light can be excluded. Thus, even if the terahertz waves which need detection and the unnecessary terahertz waves are mixed, the terahertz-wave detecting device can eliminate outputs of the unnecessary terahertz waves.

Note that, in the description above, the example in which the control signals SPCLK1 and SPCKL2 both have a duty ratio of 50% was used for explanation, but the duty ratios may be those other than 50%, and even if the duty ratios of the two control signals are different, the similar effect can be obtained. This can be understood from the fact that, if the on/off of the terahertz light source and the accumulation operation are not synchronized, the total sum of the first voltage signals and the total sum of the second voltage signals become substantially equal in one cancellation cycle. Moreover, not limited to the case of the on/off pattern with a fixed cycle, the similar effect can be obtained even with a random on/off pattern. As described above, when on/off of the light emission of the terahertz light source and the accumulation operation of the terahertz-wave detecting device are synchronized, an output can be obtained, while if they are not synchronized, the output can be cancelled.

Operation Mode to Change Set

In this embodiment shown in FIG. 1, the first terahertz light source 111 and the first terahertz-wave detecting device 112 form the first set, and the second terahertz light source 121 and the second terahertz-wave detecting device 122 form the second set. However, a combination of the terahertz light source and the terahertz-wave detector constituting a set can be easily changed. For example, the first terahertz light source 111 and the second terahertz light source 121 may be constituted such that the light emission operation in which the light is emitted in the on/off pattern with the first cycle T1 and the light emission operation in which the light is emitted in the on/off pattern with the second cycle T2 can be switched. Moreover, the first terahertz-wave detecting device 112 and the second terahertz-wave detecting device 122 may be constituted such that the detection operation synchronized with the on/off pattern with the first cycle T1 and the detection operation synchronized with the on/off pattern with the second cycle T2 can be switched. Furthermore, one unit of the terahertz light source or the terahertz-wave detector may be included in two or more different sets.

For example, the operation mode can be easily changed to the one that the first terahertz light source 111 and the second terahertz-wave detecting device 122 form a set, and the second terahertz light source 121 and the first terahertz-wave detecting device 112 form a set. Other than that, the operation mode can be also changed to the one that the first terahertz light source 111 and the first terahertz-wave detecting device 112 form a set, and the first terahertz light source 111 and the second terahertz-wave detecting device 122 form a set at the same time. Furthermore, a change can be made to such an operation mode that the first terahertz light source 111 and the first terahertz-wave detecting device 112 form a set, and the second terahertz light source 121 and the first terahertz-wave detecting device 112 form a set.

As described above, when sets are formed by a plurality of the terahertz light sources and a plurality of terahertz-wave detecting devices, the terahertz light sources and the terahertz-wave detecting devices to be combined can be optionally selected. Moreover, the set can be easily changed by a change of the on/off pattern of the light emission by the terahertz light source and switching of synchronization/non-synchronization of the accumulation operation of the terahertz-wave detecting device with respect to the on/off pattern. As described above, the on/off pattern of the light emission by the terahertz light source can be changed by the control signal Sync, and the accumulation operation (detection operation) of the terahertz light source can be changed by the control signal SPCLK.

Moreover, the terahertz light source and the terahertz-wave detecting device do not necessarily have to form a one-to-one set, but a plurality of the terahertz-wave detecting devices may form a set with one terahertz light source, or one unit of the terahertz-wave detecting device may form a set with a plurality of the terahertz light sources.

Variations of Driving Method

Subsequently, variations of a driving method of the terahertz-wave detecting device according to this embodiment will be described by using FIGS. 9 to 15.

In the explanation below, 10 to 300 µs is a suitable range for the 1-line scanning period (1H). If the 1-line scanning period (1H) is short, the frame rate can be increased, which can contribute to reduction of detection time and improvement of moving image performances when the detection data is displayed as an image. On the other hand, if the 1-line scanning period (1H) is ensured long, the number of accumulation times can be increased, which can improve the S/N. A more suitable range is 30 to 120 µs.

Moreover, a suitable range of the cycle of the accumulation operation of the first terahertz-wave detecting device 112 (first cycle T1) and the cycle of the accumulation operation of the second terahertz-wave detecting device 122 (second cycle T2) is 0.1 to 4 µs. If the cycle is short, a noise can be reduced by increasing the number of accumulation times, which can improve the S/N. On the other hand, if the cycle is ensured long, the circuit operation time can be ensured, which can suppress operation failures. A more suitable range is 1.5 to 2.5 µs.

Furthermore, the first cycle T1 and the second cycle T2 only need to be such that one cycle is other than an integral multiple of the other, but if a difference between the first cycle T1 and the second cycle T2 is 1 to 10%, it is preferable, since an output difference by the number of accumulation times can be reduced.

First Driving Method

Figure 9:
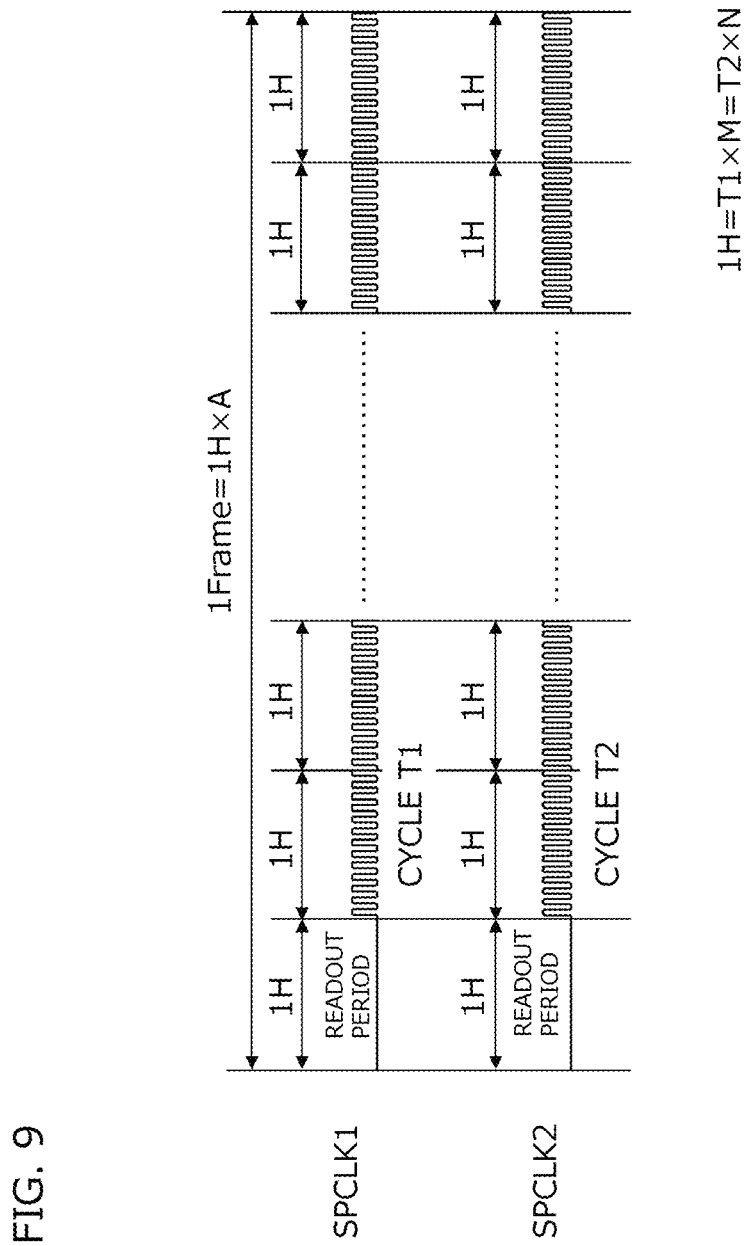
FIG. 9 is a diagram for explaining a first driving method in this embodiment.

A first driving method in this embodiment will be described by using FIG. 9. FIG. 9 illustrates waveforms during 1-frame period in the control signal SPCLK1 and in the control signal SPCLK2 described in FIG. 8.

Both the first terahertz-wave detecting device 112 and the second terahertz-wave detecting device 122 have the same lengths of the 1-line scanning period (1H) and the 1-frame period (1Frame), and the 1-frame period (1Frame) is constituted by A pieces of the 1-line scanning period (1H). In the first terahertz-wave detecting device 112, the control signal SPCLK1 repeats the H level and the L level with the first cycle T1 in the 1-line scanning period not including the read-out operation. In the second terahertz-wave detecting device 122, the control signal SPCLK1 repeats the H level and the L level with the second cycle T2 in the 1-line scanning period not including the read-out operation.

M times (M is an integer) of the first cycle T1 is the 1-line scanning period (1H), N times (N is an integer) of the second cycle T2 is the 1-line scanning period (1H), and the 1-line scanning period (1H) is the cancellation cycle. In order to eliminate the influence of the unnecessary terahertz light, the cancellation cycle only needs to be at least once in the 1-frame period.

It is preferable that synchronization is performed so that the 1-frame period or the 1-line scanning period (1H) starts at the same timing. As a result, resetting or the read-out operation of the amplification circuit in the pixel circuit can be performed at the same timing and thus, the unnecessary terahertz waves can be stably cancelled, and variation in the detection data can be suppressed. For the synchronization, it is only necessary to control the timing by a synchronization signal input into the timing generator (T/G) 206 described by using FIG. 3.

Second Driving Method

Figure 10:
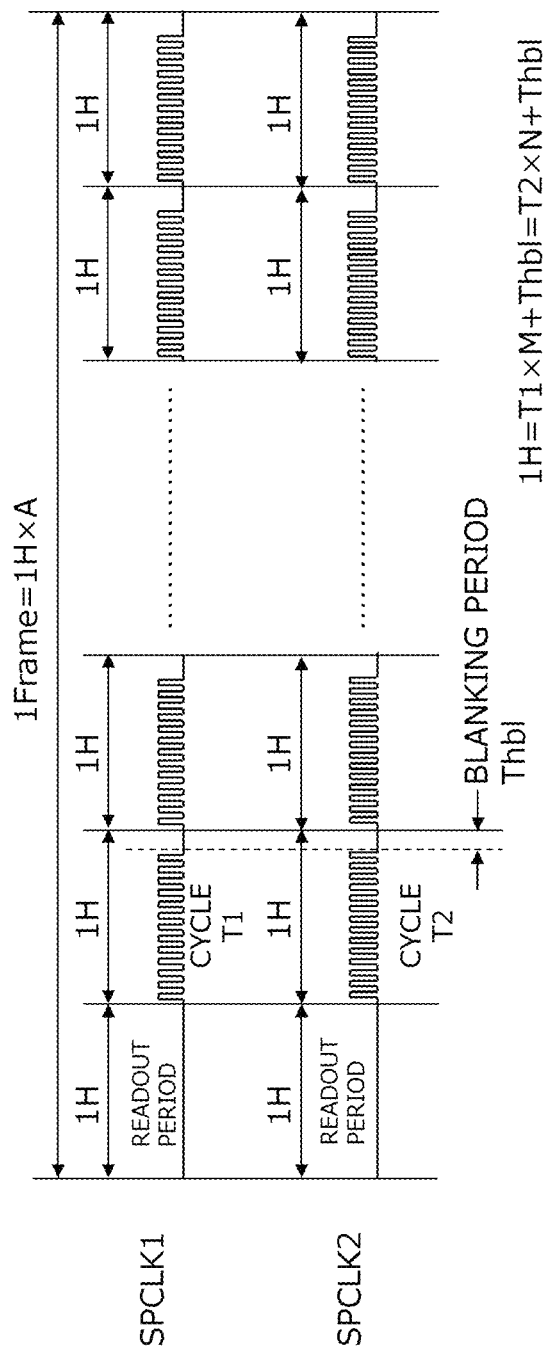
FIG. 10 is a diagram for explaining a second driving method in this embodiment.

A second driving method in this embodiment will be described by using FIG. 10. FIG. 10 is a variation of the first driving method, and a point different from FIG. 9 is that a blanking period Thb1 is provided at each 1-line scanning period (1H).

Both the first terahertz-wave detecting device 112 and the second terahertz-wave detecting device 122 have the same length of the 1-line scanning period (1H). The 1-line scanning period (1H) is equal to the sum of M times (M is an integer) of the first cycle T1 and the blanking period Thb1 and also equal to the sum of N times (N is an integer) of the second cycle T2 and the blanking period Thb1. In the blanking period Thb1, SPCLK1 and SPCLK2 may be either at the H level or the L level, but power consumption and deterioration of the terahertz light source can be suppressed by turning off the light emission of the terahertz light source.

As this embodiment, the on/off pattern of the terahertz light source and the on/off pattern of the control signal SPCLK of the terahertz-wave detecting device are not limited to the on/off pattern with a certain cycle, but there may be a period in which a state is not changed for a certain period as the blanking period Thb1.

The blanking period Thb1 can be used for a control operation period such as switching of the operation mode in which the set of the terahertz light source and the terahertz-wave detecting device described above is changed. Moreover, the 1-frame period (1Frame) can be adjusted as appropriate by adjusting the length of the blanking period Thb1. Furthermore, calculation processing of the pixel data or the like can be executed in the blanking period Thb1.

Third Driving Method

Figure 11:
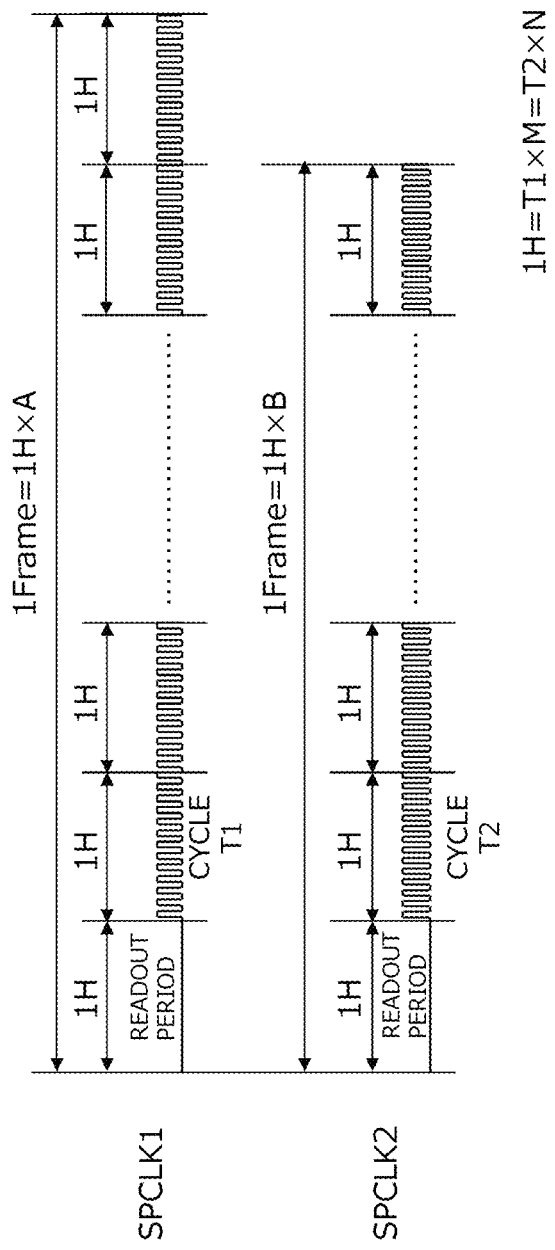
FIG. 11 is a diagram for explaining a third driving method in this embodiment.

A third driving method in this embodiment will be described by using FIG. 11. FIG. 11 is a variation of the first driving method, and a point different from FIG. 9 is that the 1-frame period of the second terahertz-wave detecting device 122 is constituted by B(≠A) pieces of the 1-line scanning period (1H).

Both the first terahertz-wave detecting device 112 and the second terahertz-wave detecting device 122 have the same length of the 1-line scanning period (1H). Here, if the first cycle T1 is larger than the second cycle T2, since the number of cycles corresponds to the number of accumulation times, the number of accumulation times in the 1-line scanning period (1H) is smaller in the first terahertz-wave detecting device 112. Thus, by increasing the number of the 1-line scanning periods (B<A) of the first terahertz-wave detecting device 112, a difference in the number of accumulation times between the first terahertz-wave detecting device 112 and the second terahertz-wave detecting device 122 is made smaller so that an output difference can be reduced.

By performing synchronization so that the 1-line scanning period (1H) starts at the same timing, the resetting and the read-out operation of the amplification circuit in the pixel circuit can be performed at the same timing and thus, the unnecessary terahertz waves can be stably cancelled, and variation in the detection data can be suppressed.

Fourth Driving Method

Figure 12:
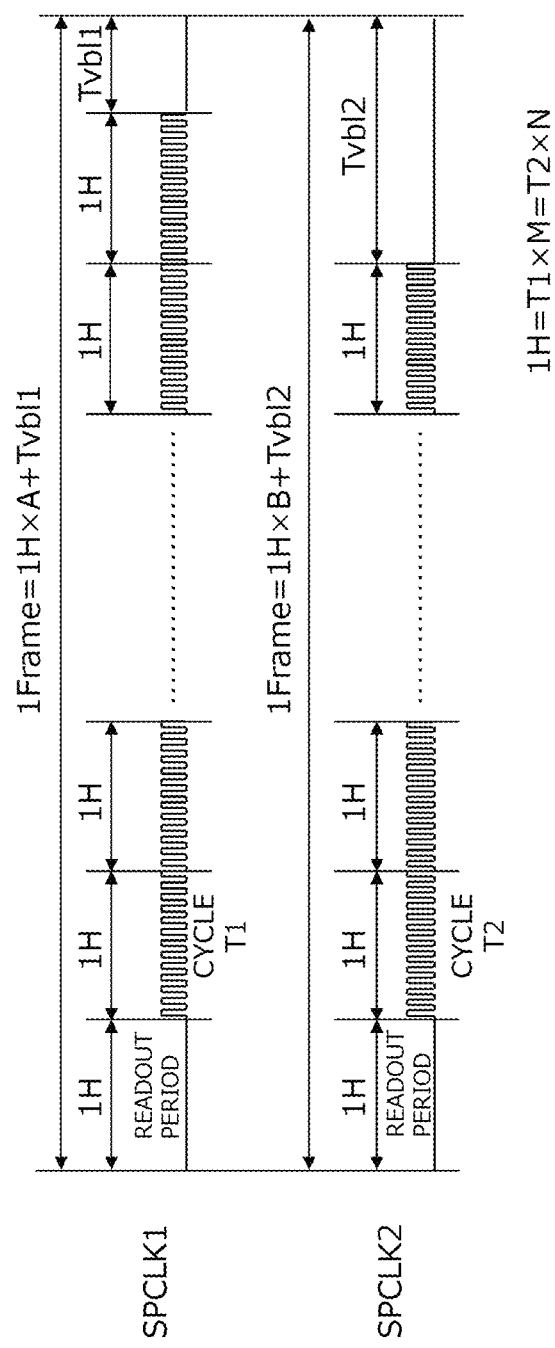
FIG. 12 is a diagram for explaining a fourth driving method in this embodiment.

A fourth driving method in this embodiment will be described by using FIG. 12. FIG. 12 is a variation of the third driving method, and a point different from FIG. 11 is that blanking periods Tvbl1 and Tvbl2 are provided in each 1-frame period (1Frame).

The first terahertz-wave detecting device 112 has the blanking period Tvbl1 in the 1-frame period, and the 1-frame period (1Frame) is the sum of A pieces of the 1-line scanning periods (1H) and the blanking period Tvbl1.

The second terahertz-wave detecting device 122 has the blanking period Tvbl2 in the 1-frame period, and the 1-frame period (1Frame) is the sum of B pieces of the 1-line scanning periods (1H) and the blanking period Tvbl2.

By providing the blanking periods Tvbl1 and Tvbl2 in each 1-frame period (1Frame), even if the numbers of the 1-line scanning periods (1H) are different, the 1-frame periods of the first terahertz-wave detecting device 112 and the second terahertz-wave detecting device 122 can be made the same. For example, when the numbers of the 1-line scanning periods (1H) are B<A, by setting the blanking periods to Tvbl1<Tvbl2, the lengths of the 1-frame periods (1Frame) can be made the same. In this case, the blanking period Tvbl1 may be zero.

According to the driving as above, the lengths of the 1-frame periods (1Frame) are the same, and a difference in the number of accumulation times in the 1-frame periods can be made smaller so that the output difference can be reduced.

In the blanking periods Tvbl1 and Tvbl2, SPCLK1 and SPCLK2 may be either at the H level and the L level, but power consumption and deterioration of the terahertz light source can be suppressed by turning off the light emission of the terahertz light source.

As this embodiment, the on/off pattern of the terahertz light source and the on/off pattern of the control signal SPCLK of the terahertz-wave detecting device are not limited to the on/off pattern with a certain cycle. These on/off patterns may include a period in which a state is not changed for a certain period as the blanking periods Tvbl1 and Tvbl2.

The blanking periods Tvbl1 and Tvbl2 can be used for a control operation period such as switching of the operation mode in which the set of the terahertz light source and the terahertz-wave detecting device described above is changed. Moreover, calculation processing of the pixel data or the like can be executed in the blanking periods Tvbl1 and Tvbl2.

Moreover, if the blanking period is an integral multiple of the 1-line scanning period (1H), system construction is easy.

It is preferable that synchronization is performed so that the 1-frame period or the 1-line scanning period (1H) starts at the same timing. As a result, the resetting and the read-out operation of the amplification circuit in the pixel circuit can be performed at the same timing and thus, the unnecessary terahertz waves can be stably cancelled, and variation in the detection data can be suppressed.

Fifth Driving Method

Figure 13:
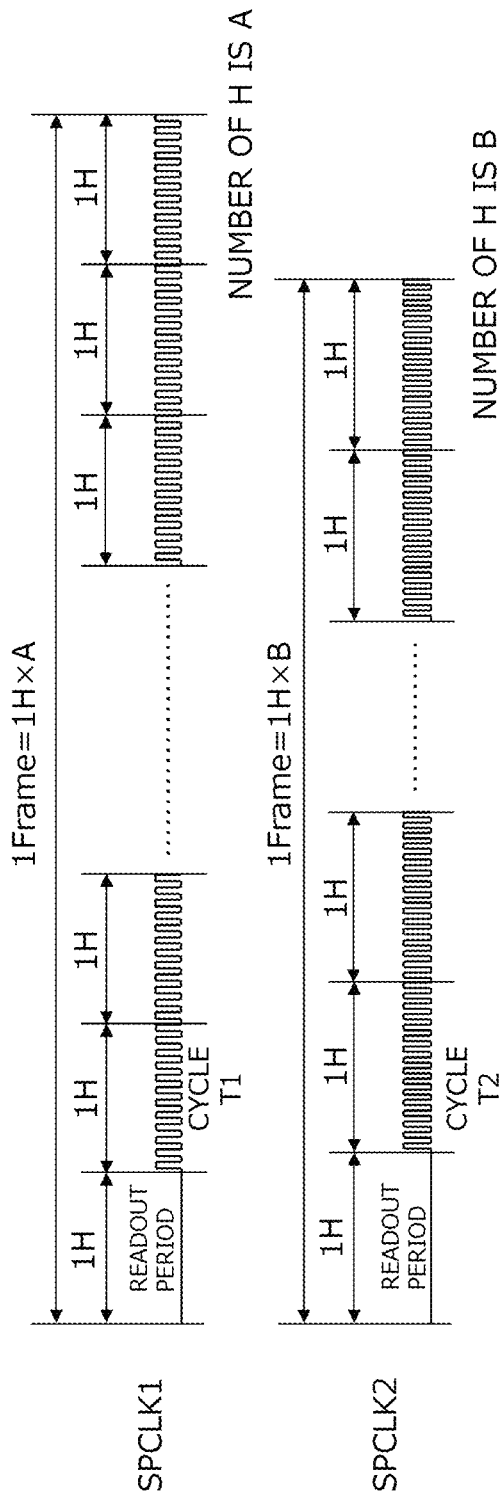
FIG. 13 is a diagram for explaining a fifth driving method in this embodiment.

A fifth driving method in this embodiment will be described by using FIG. 13. FIG. 13 is a variation of the first driving method, and a point different from FIG. 9 is that the first terahertz-wave detecting device 112 and the second terahertz-wave detecting device 122 have different lengths of the 1-line scanning period (1H) and the 1-frame periods (1Frame).

The first terahertz-wave detecting device 112 has the 1-frame period (1Frame) constituted by A pieces of the 1-line scanning periods (1H), and in the 1-line scanning period not including the read-out operation, the control signal SPCLK1 repeats the H level and the L level with the first cycle T1. The number of the on/off patterns with the first cycle T1 in the 1-line scanning period (1H) is M (M is an integer), and the number of accumulation times in the 1-line scanning period (1 H) is M times.

The second terahertz-wave detecting device 122 has the 1-frame period (1Frame) constituted by B pieces of the 1-line scanning periods (1H), and in the 1-line scanning period not including the read-out operation, the control signal SPCLK2 repeats the H level and the L level with the second cycle T2. The number of the on/off patterns with the second cycle T2 in the 1-line scanning period (1H) is N (N is an integer), and the number of accumulation times in the 1-line scanning period (1H) is N times.

The number of accumulation times in the 1-frame period (1Frame) in the first terahertz-wave detecting device 112 is expressed by (A−1)×M by subtracting the 1-line scanning period (1H) having the read-out operation. The number of accumulation times in the 1-frame period (1Frame) in the second terahertz-wave detecting device 122 is expressed by (B−1)×N by subtracting the 1-line scanning period (1H) having the read-out operation.

When driving is performed so that the following formula 1 is satisfied, the numbers of accumulation times in the 1-frame period (1Frame) become equal and thus, the outputs of the first terahertz-wave detecting device 112 and the second terahertz-wave detecting device 122 can be made equal. For example, in the case of A=B, M=N, the numbers of accumulation times in the 1-frame period (1Frame) become equal easily:

$$(A-1) \times M = (B-1) \times N \quad \text{Formula 1}$$

Moreover, if at least the following formula 2 or formula 3 is satisfied, a difference in the numbers of accumulation times in the 1-frame period can be made smaller as compared with the case otherwise, and the output difference can be reduced:

$$A < B, M > N \quad \text{Formula 2}$$

$$A > B, M < N \quad \text{Formula 3}$$

As described as the second driving method and the fourth driving method, the blanking period may be provided in each 1-line scanning period (1 H) or the 1-frame period (1Frame). By adjusting the length of the blanking period, even if the numbers of accumulation times in the 1-line scanning period (1H) are different (in the case of M≠N) or the numbers of the 1-line scanning periods (1H) are different (in the case of A≠B), the length of the 1-line scanning periods (1H) or the 1-frame periods (1Frame) of the first terahertz-wave detecting device 112 and the second terahertz-wave detecting device 122 can be made the same. In this case, synchronization can be performed so that the 1-frame period or the 1-line scanning period (1H) starts at the same timing. Therefore, the resetting and the read-out operation of the amplification circuit in the pixel circuit can be performed at the same timing and thus, the unnecessary terahertz waves can be stably cancelled, and variation in the detection data can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-64818, filed on Apr. 6, 2021, which is hereby incorporated by reference herein in its entirety.

What is claimed is:

1. A detection system comprising:
a plurality of terahertz light sources each being configured to output terahertz waves; and
a plurality of terahertz-wave detecting devices each being configured to detect the terahertz waves output from the plurality of terahertz light sources,
wherein the plurality of terahertz light sources comprises a first terahertz light source configured to output the terahertz waves in a first on/off pattern with a first cycle, and a second terahertz light source configured to output the terahertz waves in a second on/off pattern with a second cycle which is different from the first cycle, and
the plurality of terahertz wave detecting devices comprises a first terahertz-wave detecting device configured to detect the terahertz waves in synchronization with the first on/off pattern, and a second terahertz-wave detecting device configured to detect the terahertz waves in synchronization with the second on/off pattern,
wherein the plurality of terahertz-wave detecting devices perform:
a first operation of holding a first voltage signal generated in a first period; and
a second operation of generating a second voltage signal generated in a second period and of accumulating a storage voltage determined from a differential voltage signal between the first voltage signal and the second voltage signal.

2. The detection system according to claim 1, wherein at least one of the plurality of terahertz-wave detecting devices is capable of switching between an operation of detecting the terahertz waves in synchronization with the first on/off pattern and an operation of detecting the terahertz waves in synchronization with the second on/off pattern.

3. The detection system according to claim 1, wherein the first cycle is other than an integral multiple of the second cycle, and the second cycle is other than an integral multiple of the first cycle.

4. The detection system according to claim 1, wherein
in one of the plurality of terahertz-wave detecting devices, the first period is a period in which light emission of the first terahertz light source is off, and the second period is a period in which the first terahertz light source is emitting light; and
in another one of the plurality of terahertz-wave detecting devices, the first period is a period in which light emission of the second terahertz light source is off, and the second period is a period in which the second terahertz light source is emitting light.

5. The detection system according to claim 1, wherein the plurality of terahertz-wave detecting devices perform an integral operation by repeatedly accumulating the storage voltages by repeating the first operation and the second operation.

6. The detection system according to claim 1, wherein the plurality of terahertz-wave detecting devices include a terahertz-wave detection portion, a signal amplification portion, and a signal accumulation portion,
wherein the signal amplification portion amplifies the signal generated by the terahertz-wave detection portion to generate the first voltage signal and the second voltage signal, and
wherein the signal accumulation portion accumulates the storage voltages.

7. The detection system according to claim 6,
wherein the signal accumulation portion includes a clamp capacitor and a storage capacitor,
wherein the first voltage signal or the second voltage signal is applied to one end of the clamp capacitor,
wherein in the first operation, the other end of the clamp capacitor is fixed to a fixed voltage, and
wherein in the second operation, the other end of the clamp capacitor is connected to the storage capacitor.

8. The detection system according to claim 6, wherein the terahertz-wave detection portion includes an antenna and a diode.

9. The detection system according to claim 6, wherein the plurality of terahertz-wave detecting devices reset the signal amplification portion while the first operation is performed.

10. The detection system according to claim 6, wherein in the plurality of terahertz-wave detecting devices, a plurality of pixels having at least the terahertz-wave detection portion, the signal amplification portion, and the signal accumulation portion are disposed in a matrix state, and output signals of the pixels are read out for each line of the matrix.

11. The detection system according to claim 10, wherein a length of a 1-line scanning period of the first terahertz-wave detecting device which detects the terahertz waves in synchronization with the first on/off pattern of the first terahertz light source and a length of a 1-line scanning period of the second terahertz-wave detecting device which detects the terahertz waves in synchronization with the second on/off pattern of the second terahertz light source are the same.

12. The detection system according to claim 11, wherein the numbers of the 1-line scanning periods in 1-frame periods of the first terahertz-wave detecting device and the second terahertz-wave detecting device are the same.

13. The detection system according to claim 11, wherein the numbers of the 1-line scanning periods in the 1-frame periods of the first terahertz-wave detecting device and the second terahertz-wave detecting device are different, and the one with the smaller number of accumulation times in the 1-line scanning period has a larger number of the 1-line scanning periods in the 1-frame period.

14. The detection system according to claim 11, wherein in the first terahertz-wave detecting device and the second terahertz-wave detecting device, the 1-line scanning periods start in synchronization.

15. The detection system according to claim 11, wherein in the first terahertz-wave detecting device and the second terahertz-wave detecting device, the 1-frame periods start in synchronization.

16. The detection system according to claim 11, wherein a blanking period is provided in the 1-line scanning period or the 1-frame period.

17. The detection system according to claim 10, wherein a length of the 1-line scanning period of the first terahertz-wave detecting device which detects terahertz waves in synchronization with the first on/off pattern of the first terahertz light source and a length of the 1-line scanning period of the second terahertz-wave detecting device which detects the terahertz waves in synchronization with the second on/off pattern of the second terahertz light source are different, and
at least any one of formula 1, formula 2, and formula 3 below is satisfied:

$$(A-1) \times M = (B-1) \times N \qquad \text{Formula 1}$$

$$A < B, M > N \qquad \text{Formula 2}$$

$$A > B, M < N \qquad \text{Formula 3}$$

A: Number of 1-line scanning periods in a 1-frame period of the first terahertz-wave detecting device;
B: Number of 1-line scanning periods in the 1-frame period of the second terahertz-wave detecting device;
M: Number of on/off patterns with the first cycle in the 1-line scanning period of the first terahertz-wave detecting device; and
N: Number of on/off patterns with the second cycle in the 1-line scanning period of the second terahertz-wave detecting device.

18. An image forming apparatus comprising:
a plurality of terahertz light sources each being configured to output terahertz waves; and
a plurality of terahertz-wave detecting devices each being configured to detect the terahertz waves output from the plurality of terahertz light sources,
wherein the plurality of terahertz light sources includes a first terahertz light source configured to output the terahertz waves in a first on/off pattern with a first cycle, and a second terahertz light source configured to output the terahertz waves in a second on/off pattern with a second cycle which is different from the first cycle,
each of the plurality of terahertz-wave detecting devices has pixels having at least a terahertz-wave detection portion, a signal amplification portion, and a signal accumulation portion and disposed in plural in a matrix state, and
the plurality of terahertz detecting devices includes a first terahertz-wave detecting device configured to detect the terahertz waves in synchronization with the first on/off pattern, and a second terahertz-wave detecting device configured to detect the terahertz waves in synchronization with the second on/off pattern,
wherein the plurality of terahertz-wave detecting devices perform:
a first operation of holding a first voltage signal generated in a first period; and
a second operation of generating a second voltage signal generated in a second period and of accumulating a storage voltage determined from a differential voltage signal between the first voltage signal and the second voltage signal.

* * * * *